United States Patent [19]

Yoshino

[11] 4,107,647

[45] Aug. 15, 1978

[54] DECELERATION INDICATING SYSTEM

[75] Inventor: Muneki Yoshino, Toyokawa, Japan

[73] Assignee: Nippondenso Co., Ltd., Kariya, Japan

[21] Appl. No.: 675,751

[22] Filed: Apr. 12, 1976

[30] Foreign Application Priority Data

| | | | |
|---|---|---|---|
| Apr. 14, 1975 | [JP] | Japan | 50-45686 |
| Apr. 16, 1975 | [JP] | Japan | 50-51600[U] |
| May 13, 1975 | [JP] | Japan | 50-57139 |
| May 16, 1975 | [JP] | Japan | 50-59101 |
| May 28, 1975 | [JP] | Japan | 50-72444[U] |
| Jun. 4, 1975 | [JP] | Japan | 50-68049 |
| Jun. 24, 1975 | [JP] | Japan | 50-87358[U] |
| Jun. 4, 1975 | [JP] | Japan | 50-68050 |
| Jun. 18, 1975 | [JP] | Japan | 50-74957 |
| Jun. 23, 1975 | [JP] | Japan | 50-77213 |
| Jul. 31, 1975 | [JP] | Japan | 50-93865 |
| Aug. 6, 1975 | [JP] | Japan | 50-96239 |
| Jan. 8, 1976 | [JP] | Japan | 51-1890 |

[51] Int. Cl.² ............................................. B60Q 1/26
[52] U.S. Cl. .......................................... 340/71; 340/69;
340/72; 340/66; 200/61.45 R; 340/669
[58] Field of Search .............. 340/71, 69, 52 B, 52 C,
340/52 H, 72, 66, 262; 200/61.45 R, 61.83,
61.48, 61.52

[56] References Cited

U.S. PATENT DOCUMENTS

| | | | |
|---|---|---|---|
| 3,431,556 | 3/1969 | Johnson | 340/72 |
| 3,519,987 | 7/1970 | Jania | 340/72 |
| 3,528,056 | 9/1970 | Voevodsky | 340/72 |
| 3,538,496 | 11/1970 | Bumpous | 340/71 |
| 3,593,278 | 7/1971 | Bower | 340/72 |
| 3,846,749 | 11/1974 | Curry | 340/72 |

Primary Examiner—John W. Caldwell, Sr.
Assistant Examiner—Donnie L. Crosland
Attorney, Agent, or Firm—Cushman, Darby & Cushman

[57] ABSTRACT

A deceleration indicating system wherein when the deceleration of a running vehicle exceeds a specified value, an emergency deceleration indication is made externally which is different from that deceleration indication which is made when the deceleration of the vehicle is lower than the specified value. The drivers of other vehicles in the vicinity of and behind this vehicle can discriminate according to the deceleration indication of the vehicle whether its deceleration is of a normal kind or emergency kind. This emergency deceleration indication is returned to the normal indication in response to the operation of a manual switch, accelerator pedal or brake pedal.

4 Claims, 47 Drawing Figures

DECELERATION INDICATING SYSTEM

BACKGROUND OF THE INVENTION

1. Field of the Invention

The present invention relates to a deceleration indicating system for vehicles whereby upon rapid deceleration of a vehicle, a lamp or lamps are caused to flash on and off or a buzzer is operated to warn, for example, the driver in the following vehicle of the rapid deceleration and thereby to prevent the occurrence of rear-end collision, etc.

2. Description of the Prior Art

At present, rear-end collisions account for a large part of the vehicle accidents occurred in the city districts. This appears to have been caused by the fact that the proceeding vehicle signals its driving conditions to the following vehicle by means of the red lamp or lamps which are lighted when the brake pedal is depressed, namely, the stop lights which light up independently of the deceleration rate of the proceeding vehicle are the only available means for ascertaining its driving conditions. In other words, only a slight depression of the brake pedal can cause the lighting of the stop lamps which are the only means for signaling the driving conditions of the proceeding vehicle to the following vehicle. At present, there are two general types of switches used for operating the stop lamp or lamps: (1) a displacement switch in which a microswitch or the like is operated when the amount of depression of the brake pedal exceeds a specified value, and (2) a hydraulic switch which is operated when the brake fluid pressure exceeds a specified value. However, since these switches are operated independently of the magnitude of the force applied to depress the brake pedal, none of these switches is considered satisfactory from safety point of view in terms of the ability to inform the following vehicle of the degree of danger involved. Some driver in the following vehicle is fatigued with unnecessary attentions caused by the operation of the lamps on the proceeding vehicle. Further, when the driver of a first vehicle applies the brakes unnecessarily, there is the danger of the driver of a second following vehicle quickly applying the brakes and causing the second following vehicle itself to be struck from behind by another vehicle.

Still further, if the driver of the following vehicle gets used to the frequent operations of the brake lights on the proceeding vehicle, even if the driver of the proceeding vehicle applies the brakes quickly and the resultant lighting of the brake lamps is observed by the driver of the following vehicle, this cannot arouse much attention of the following vehicle's driver giving rise to the danger of rear-end collision.

Thus, there has existed a need for an improved deceleration indicating system which can replace the conventional systems and by which when the driver of the proceeding vehicle really senses danger and quickly applies the brakes, the driver of the following vehicle can be positively informed of this danger.

SUMMARY OF THE INVENTION

It is an object of this invention to provide an improved deceleration indicating system wherein the deceleration of a vehicle is detected so that when the detected deceleration is higher than a predetermined value, the deceleration indicator is turned on and off intermittently to arouse for example the attention of the driver of the following vehicle and properly inform him of the rapid deceleration.

It is another object of this invention to provide an improved deceleration indicating system wherein the frequency of on-off operations or output of the deceleration indicator is varied in accordance with the magnitude of deceleration to quantitatively signal the deceleration of the vehicle to the drivers of other vehicles and enable them to ascertain the driving conditions of the vehicle, thereby preventing the occurrence of rear-end collision, etc.

It is still another object of this invention to provide an improved deceleration indicating system wherein the braking indicator for indicating the application of the brakes is operated in response to the application of the brakes, the acceleration indicator is operated under acceleration driving conditions or the deceleration indicator is operated under so-called rapid deceleration driving condition where the rate of deceleration is higher than a predetermined value to thereby properly inform the drivers of other vehicles of the driving conditions, i.e., the braking, acceleration or rapid deceleration driving conditions of the vehicle with a view to facilitating their driving and preventing the occurrence of rear-end collision, etc.

DESCRIPTION OF THE PREFERRED EMBODIMENTS

Figure 1:
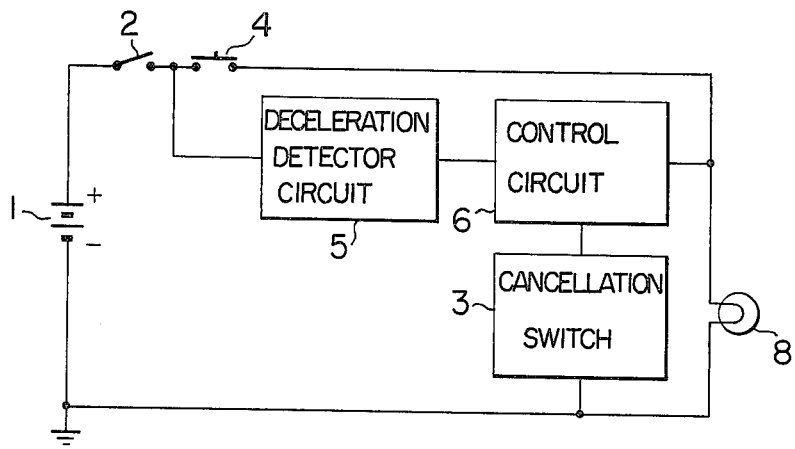
FIG. 1 is a block diagram showing a first embodiment of a deceleration indicating system of this invention.

Referring first to FIG. 1 showing in block diagram form the construction of a first embodiment of this invention, when an ignition switch 2 is closed and a brake switch 4 linked to the brake pedal is operated, lamp means 8 constituting indicator means is connected to a battery 1 and the lamp means 8 lights up. The operation described so far is the same as in the case of the conventional brake lamps, and when under deceleration driving conditions a deceleration detector circuit 5 is closed under rapid deceleration greater than a predetermined value, the lamp means 8 is caused to flash on and off through switching means of a control circuit 6 which is opened and closed alternately. Thereafter, a cancellation switch 3 is manually or automatically brought into operation, thereby restoring the control circuit to the initial conditions.

Figure 2:
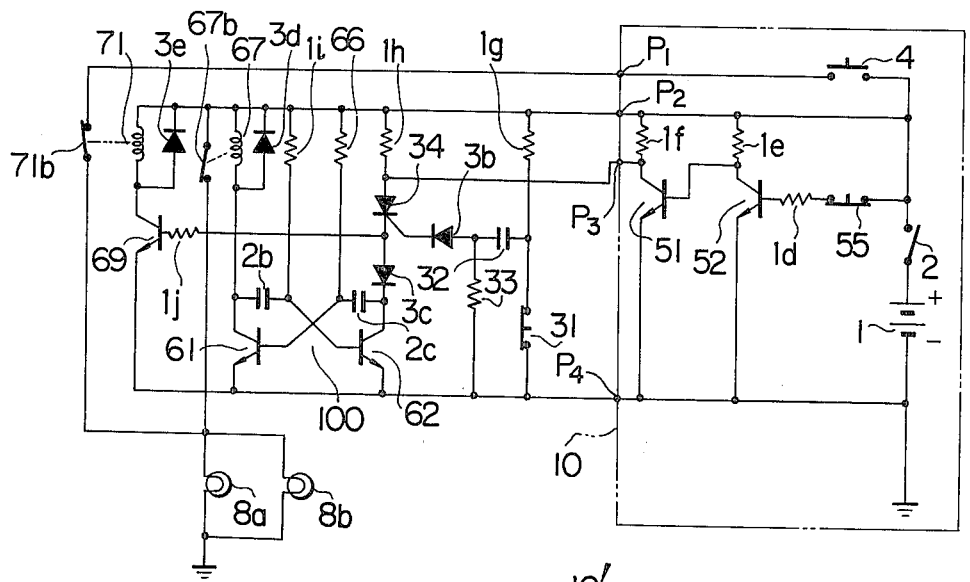
FIG. 2 is a detailed circuit diagram for the embodiment of FIG. 1.

More specifically, in FIG. 2, when the ignition switch 2 is turned on, since a switch 31 (deceleration detector) is in the closed position, no high voltage is applied to the gate of a thyristor 34 holding it off and a transistor 62 remains off. The base current flows to a transistor 61 through a resistor 66 turning it on and a relay 67 is operated opening contacts 67b. No base current flows to a transistor 69 holding it off and contacts 71b of a relay 71 remain closed. In this condition when the brake pedal is depressed, the brake switch 4 is turned on so that lamps 8a and 8b continuously light up until the switch 31 is turned off. When the switch 31 is turned off in response to the detection of a deceleration greater than a predetermined value, a positive pulse differentiated by a capacitor 32 and a resistor 33 is applied to the gate of the thyristor 34 so that the thyristor 34 is turned on and the transistor 62 is turned on causing an astable multivibrator 100 to start oscillating. At the same time, the transistor 69 is kept conductive so long as the thyristor 34 is conductive to thereby cause the contacts 71b of the relay 71 to open. Consequently, the lamps 8a and 8b do not light up through the contacts 71b even if the brake switch 4 is turned on. By that time, the contacts 67b of the relay 67 has already started oscillation (on-off operation) and consequently the lamps 8a and 8b flash on and off. While oscillating, when a manual switch 55 (a switch which remains closed until it is manually actuated to open) is depressed so that a transistor 52 is turned off and a transistor 51 is turned on, the collector voltage of the transistor 51 decreases and the thyristor 34 is turned off thus stopping the oscillation and thereby restoring the multivibrator 100 to the initial conditions.

Thus, with the above-described first embodiment, while the lamps 8a and 8b are normally turned on and off in accordance with the operation of the brake switch 4, when the switch 31 constituting the deceleration detector (G sensor) is operated, the lamps 8a and 8b are caused to flash on and off by the switching means comprising the multivibrator 100 and the relay 67 for continuous on-off operations to clearly warn the following vehicle that not only the brake switch 4 has been turned on but also the G sensor 31 has come into operation indicating the actual occurrence of the deceleration greater than a predetermined value. In FIG. 2, numeral 1 designates a battery, 1d, 1e, 1f, 1g, 1h, 1i and 1j resistors, 2b and 2c capacitors, 3b, 3c, 3d and 3e diodes.

Figure 3:
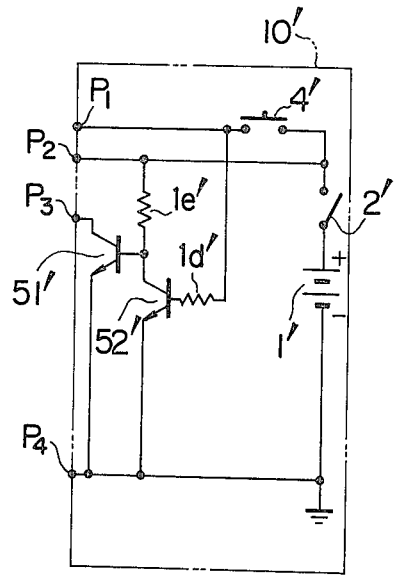
FIG. 3 is a circuit diagram showing a modified form of the deceleration detecting section shown in FIG. 2.

Referring now to FIG. 3, there is shown a modified form of the portion designated at the block 10 enclosed by the two-dot chain line in FIG. 2. This arrangement of FIG. 3 differs from that of FIG. 2 in that the normally closed cancellation switch 55 is replaced with a brake switch 4', that is, the base of a transistor 52' is connected to the battery 1' through the resistor 1d' and the brake switch 4', and points $P_1$, $P_a$, $P_3$ and $P_4$ are connected respectively to points $P_1$, $P_2$, $P_3$ and $P_4$ of FIG. 2. In FIGS. 2 and 3, when the brake pedal is not depressed, the transistor 52' is off and a transistor 51' is on so that the thyristor 34 is not turned on even if the switch 31 constituting the G sensor is turned off. Then, when the brake pedal is depressed, the transistor 51' is turned off so that when the switch or G sensor 31 is turned off, the thyristor 34 is turned on and the multivibrator 100 starts oscillating causing the lamps 8a and 8b to flash on and off. Thereafter, when the brake pedal is released so that the brake switch 4' is turned off and the transistor 51' is turned on, the thyristor 34 is turned off and the multivibrator 100 stops the oscillation.

Figure 4:
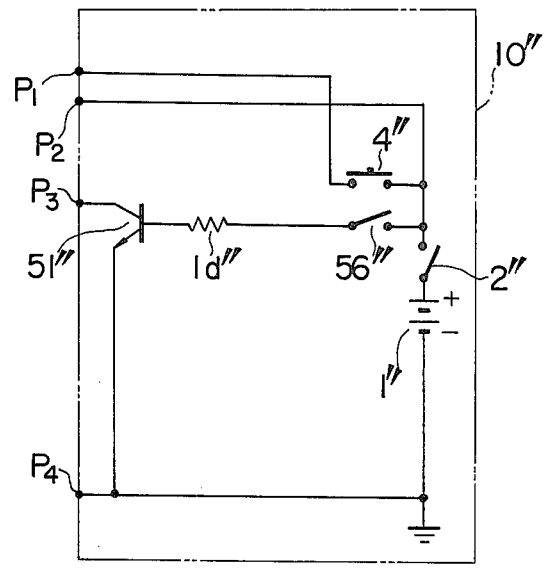
FIG. 4 is a circuit diagram showing another modified form of the deceleration detecting section shown in FIG. 2.

FIG. 4 shows another modified form of the section designated at the block 10 which is enclosed with the two-dot chain line in FIG. 2. In the Figure, the normally closed manual switch 55 (cancellation switch) shown in FIG. 2 is replaced by an accelerator switch 56" (a switch which is turned on in response to the depression of the accelerator pedal) and that portion of FIG. 2 arranged to the right of the points $P_1$, $P_2$, $P_3$ and $P_4$ is replaced with the arrangement of FIG. 4. In FIGS. 2 and 4, while oscillating, when the accelerator pedal is depressed so that the accelerator switch 56" is turned on, a transistor 51" is turned on decreasing its collector voltage and the thyristor 34 is turned off stopping the oscillation of the multivibrator 100.

Of course, the deceleration detector used in the above-mentioned embodiments may be replaced by any of various known types of detectors such as one which employs a pendulum.

Further, while, in the above-mentioned embodiments, the switching means employs a multivibrator, it is needless to say that any other switching means such as a flicker relay utilizing the charging and discharging of a capacitor or on-off contacts which are mechanically closed and opened may also be used. Furthermore, while the indicator means comprises lamps, any other alarm means such as a buzzer may also be used, in which case the application of the brakes results in the lighting of the brake lamp or lamps in the similar manner as the conventional devices and moreover the operation of the G sensor causes the buzzer to make a buzzing noise intermittently and arouse the attention of the following vehicle's driver. Alternately, this intermittent buzzing noise of the buzzer may be effected simultaneously with the intermittent flashing operations of the lamps.

A second embodiment of this invention will now be described.

Figure 5:
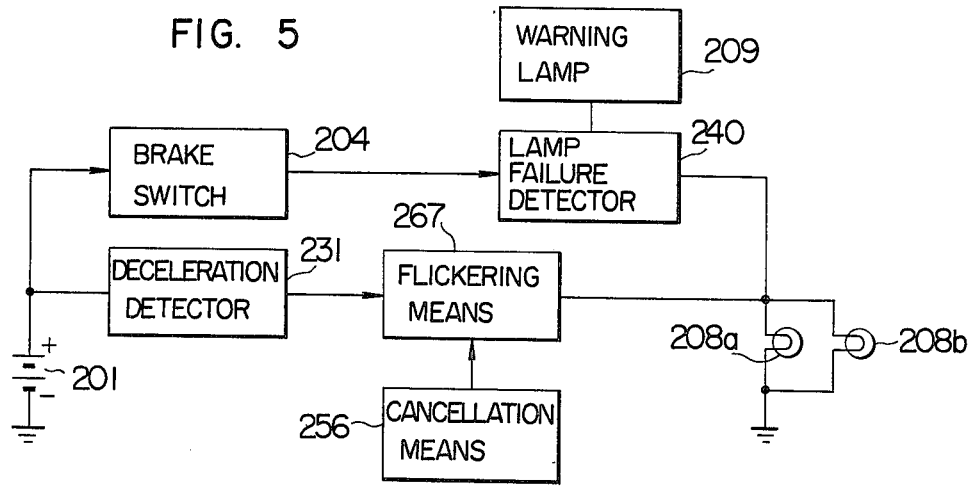
FIG. 5 is a block diagram showing a second embodiment of the system according to the invention.

Referring now to the block diagram of FIG. 5, when a brake switch 204 (Linked to the brake pedal) is turned on or off, brake lamps 208a and 208b are caused to go on or off. When the brake pedal is pressed down firmly so that the vehicle has a deceleration greater than a predetermined value, a deceleration detector 231 comes into operation and the brake lamps 208a and 208b are caused to flash on and off through flickering means 267, thereby calling special attention of the following vehicle's driver. Numeral 240 designates a lamp failure detector for detecting the burning out of the lamps 208a and 208b which is designed so that when either of the lamps 208a and 208b is burnt out, a lamp 209 constituting warning means is caused to go on continuously informing the driver of the burnt-out lamp. In other words, in the second embodiment the lamp failure detector 240 is disposed on the side of the brake switch 204 so that when either of the lamps 208a and 208b is burnt out, the magnetomotive force of the coil included in the lamp failure detecting circuit becomes insufficient to maintain the normally closed contacts open and the lamp 209 constituting warning means is lighted continuously. Consequently, when the brake pedal is depressed, the brake lamps 208a and 208b are lighted and the lamp 209 is turned off in synchronism with the lighting of the brake lamps, whereas if either one of the brake lamps is burnt out the lamp 209 remains on despite the lighting of the brake lamp, indicating to the driver the occurrence of an irregularity.

On the other hand, when the deceleration detector 231 comes into operation to cause the brake lamps 208a and 208b to flash on and off, the warning lamp 209 remains on irrespective of whether either one of the brake lamps 208a and 208b is burnt out. Consequently, each time the driver depresses the brake pedal, it is possible to ascertain whether one or both of the brake lamps 208a and 208b are burnt out and therefore, if any, the presence of the burnt-out lamp 208a or 208b or both can be detected positively. Thus, while, with one of the brake lamps 208a and 208b, e.g., the lamp 208b burnt out, if the vehicle is decelerated rapidly, the brake lamp on the left, e.g., the lamp 208a alone is caused to flash on and off sending out a deceleration signal and causing the driver of the following vehicle to mistake this signal for a left turn signal and cause a rear-end collision or the like, such an accident may be prevented with this embodiment.

Figure 6:
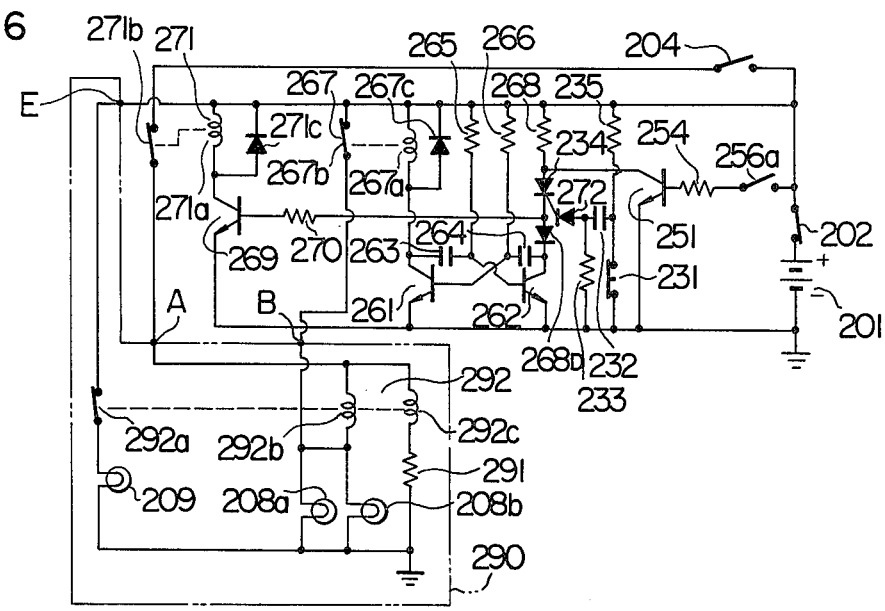
FIG. 6 is a detailed circuit diagram for the second embodiment shown in FIG. 5.

The second embodiment will now be described in greater detail with reference to its detailed circuit diagram. In FIGS. 5 and 6, numeral 201 designates a battery, 202 an ignition switch, 204 a brake switch, 256a an acceleration switch (a switch which is turned on in response to the depression of the accelerator pedal) constituting the cancellation means 256 of FIG. 5. Numeral 231 designates a deceleration detector (normally closed), 261 and 262 transistors, 263 and 264 capacitors connected respectively to the collectors of the transistors 261 and 262, 265 and 266 base resistors, 268 a collector resistor of the transistor 262, 267 a relay whose coil 267a constitutes a collector load of the transistor 261, 267c an arc suppressing diode. The transistors 261 and 262 form an astable multivibrator constituting the flickering means 267 of FIG. 5. Numeral 234 designates a thyristor whereby when the deceleration detector 231 is operated (turned off), a differentiated pulse from a resistor 235 which is generated through a resistor 233 and a coapacitor 232 is applied to the gate of the thyristor 234 through a diode 272. Numeral 268D designates a signal blocking diode, 251 a transistor having its collector connected to the anode of the thyristor 234 and constituting a conduction stopping transistor for the thyristor 234, 254 a base resistor, 269 a transistor connected to the cathode of the thyristor 234 through a base resistor 270 and disposed to be turned on in response to the application of an "ON" signal from the thyristor 234. Numeral 271 designates a relay, 271a a coil of the relay 271 constituting the collector load of the transistors 269, 271c an arc suppressing diode, 267b and 271b normally closed contacts of the relays 267 and 271 which are connected to relay coils 292b and 292c. The relay coils 292b and 292c constitute respectively the current and voltage coils of a relay 292 and they are wound in the opposite directions to induce opposite electromotive forces. The coil 292c is a known type of voltage variation compensating coil for preventing the magnetomotive force from increasing in response to a rise in the battery voltage. Numeral 291 a resistor connected in series with the voltage coil 292c, 208a and 208b brake lamps, 209 a lamp connected in series with relay contacts 292a and constituting warning means for indicating the failure of the lamps 208a and 208b.

With the construction described above, the operation of the second embodiment is as follows.

(1) With the accelerator pedal depressed, if the acceleration switch 256a is turned on, namely, when the cancellation means 256 is operated, the base current flows to the transistor 251 through the resistor 254 and the transistor 251 is turned on decreasing its collector voltage. Consequently, the thyristor 234 is not turned on even if the deceleration detector 231 is operated (turned off), namely, even if a positive differentiated pulse is applied to the gate of the thyristor 234, the astable multivibrator constituting the flickering means 267 does not oscillate. On the other hand, since the transistor 262 is off, the transistor 261 is on with the result that the relay coil 267a is energized and the contacts 267b are opened. At that time, no base current is applied to the transistor 269 so that the transistor 269 remains off and no current flows to the relay coil 271a holding the contacts 271b closed. Consequently, if in this condition the brake pedal is depressed, the switch 204 is closed and the brake lamps 208a and 208b are simply lighted.

(2) When the deceleration detector 231 is not turned off in response to the depression of the brake pedal (the brake switch 204 is turned on), the brake lamps 208a and 208b which also serve as the deceleration indicator lamps are lighted through the current coil 292b. At this time, the contacts 292a are opened by the net magnetomotive force of the two coils 292b and 202c and the warning lamp 209 is turned off. In other words, this is an indication that none of the brake lamps is burnt out.

(3) With the acceleration switch 256a turned off, when the deceleration detector 231 is turned off irrespective of whether the brake pedal has been depressed or not, that is, a rapid deceleration of the vehicle occurs, a positive differentiated pulse produced by the resistor 235, the capacitor 232 and the resistor 233 is applied to the gate of the thyristor 234 through the diode 272 so that the thyristor 234 is turned on and current is supplied to the collector of the transistor 262 through the diode 234 causing the transistors 261 and 262 to start oscillating. At that time, the base current flows from the thyristor 234 to the transistor 269 through the resistor 270 so that the transistor 269 is kept conductive so long as thyristor 234 is conductive to thereby energize the relay coil 271 to open. Consequently, the contacts 271b are opened and thus the brake lamps 208a and 208b do not light up through the contacts 271b irrespective of whether the brake switch 204 is in the on or off position. Due to the oscillation of the transistors 261 and 262, the relay 267 repeats a continuous on-and-off cycle of operations and current flows to the lamps 208a and 208b through the coil 292b causing the lamps 208a and 208b to flash on and off. In other words, the brake lamps flicker during the rapid deceleration of the vehicle. In this condition, when the accelerator pedal constituting the cancellation means 256 is depressed, the intermittent flashing of the brake lamps is terminated by the reasons mentioned in (1) above.

(4) With one or both of the brake lamps 208a and 208b burnt out and the deceleration detector 231 remaining closed, when the brake pedal is depressed, as compared with the current flow in the normal condition (with none of the lamps 208a and 208b burnt out), the amount of current flow to the coil 292b decreases (but the opposite magnetomotive force of the voltage coil 292c remains unchanged), the contacts 292a remain closed to have the lamp 209 lighted. Namely, the lighting of the lamp 209 during the depression of the brake pedal indicates the presence of the buntout lamp or lamps. The coil 292c is a known type of voltage variation compensating coil which is arranged to induce a magnetomotive force opposite to that induced in the current coil 292b and increase its magnetomotive force to maintain the attraction force of the contacts 292a constant when the voltage of the battery 201 rises.

Figure 7:
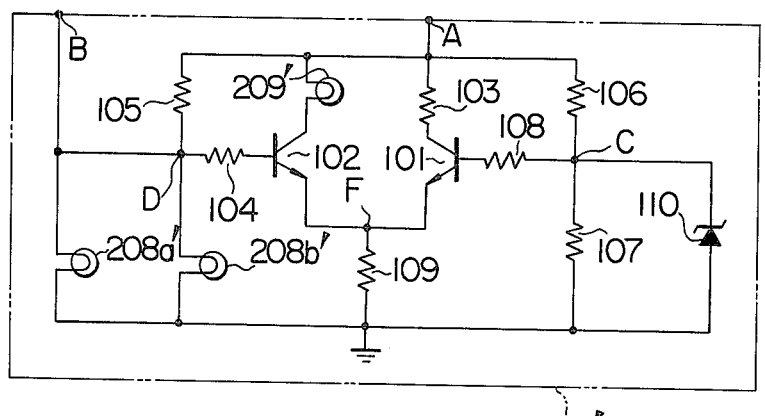
FIG. 7 is a circuit diagram showing a modified form of the lamp failure detecting section used in the second embodiment of FIG. 6.

Referring now to FIG. 7, a modified form of the lamp failure detecting section of the second embodiment will be described. While the lamp failure detecting section of FIG. 6 employs the coil 292b, the arrangement of FIG. 7 employs transistors for lamp failure detecting purposes and this arrangement may be used in place of the lamp failure detecting section of FIG. 6 to obtain a deceleration detecting system similar to the above described second embodiment.

In the Figure, terminals A and B are provided in place of terminals A and B in FIG. 6. A terminal E of FIG. 6 is eliminated in the arrangement of this Figure. Numeral 110 designates a zener diode, 101 and 102 transistors, 103 a collector load of the transistor 101, 209' a lamp or collector load of the transistor 102 which constitutes a failure warning lamp for lamps 208a' and 208b'. Numerals 108 and 104 designate base resistors of the transistors 101 and 102 whose one sides are subjected to voltage division by the resistors 108 and 106 and the resistor 105 and the lamps 208a' and 208b', respectively. In other words, the transistors 101 and 102 constitute a differential amplifier.

With the construction described above, the transistors 101 and 102 constitute a differential amplifier wherein the emitters of the transistors 101 and 102 are connected to a resistor 109 and it is arranged so that in the normal condition (the lamps are functioning normally) the voltage at a juncture C of the resistors 106 and 107 is slightly higher than that at a juncture D of the resistor 105 and the lamps 208a' and 208b'. At that time, the transistor 101 is turned on causing a current flow to the emitter resistor 109 and the potential at a point F is increased turning the transistor 102 off. In this condition, if one or both of the lamps 208a' and 208b' are burnt out, the potential at the point D becomes higher than that at the point C with the result that the transistor 102 is turned on and the transistor 101 is turned off. When the transistor 102 is turned on, the lamp 209' is lighted indicating a lamp failure.

Next, third and fourth embodiments of this invention will now be described.

Figure 8:
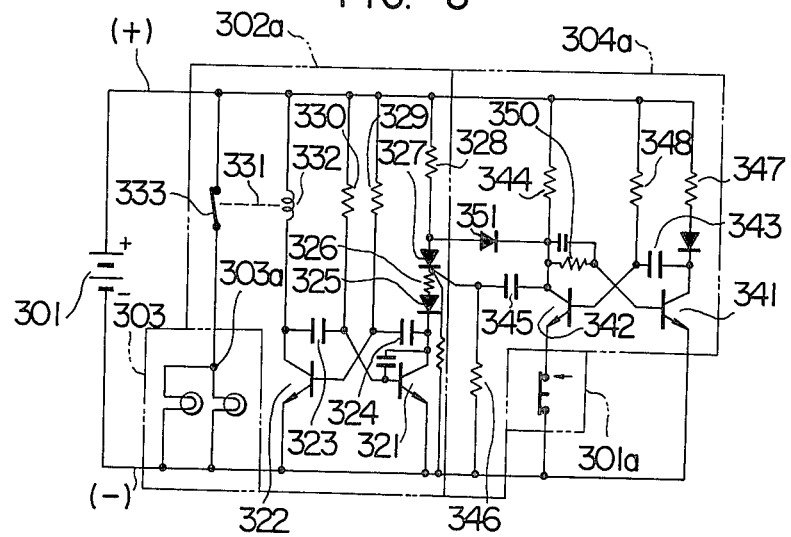
FIG. 8 is a circuit diagram showing a third embodiment of the system of this invention.
Figure 9:
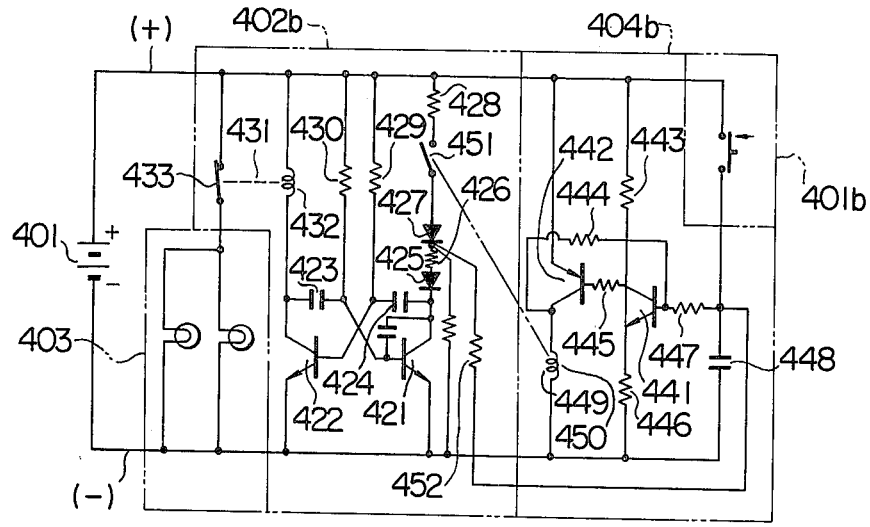
FIG. 9 is a circuit diagram showing a fourth embodiment of the system of this invention.

In FIGS. 8 and 9 illustrating respectively the third and fourth embodiments, symbols (+) and (−) designate DC supply terminals of a battery 301 (401), 301a in FIG. 8 a normally closed deceleration detector, 401b in FIG. 9 a normally open deceleration detector, 302a (402b) an oscillator circuit constituting switching means such as an astable multivibrator, 303 (403) warning lamps constituting warning means, 304a (404b) a timing circuit such as a delay circuit.

Referring first to FIG. 8 illustrating the third embodiment, with the normally closed deceleration detector 301a in the closed position, in the monostable multivibrator comprising transistors 341 and 342, the transistor 342 is turned on decreasing its collector voltage and no positive voltage is applied to the gate of a thyristor 327. Consequently, the thyristor 327 remains off and a transistor 321 is turned off supplying the base current to a transistor 322 through a resistor 329. As a result, the transistor 322 is turned on so that a coil 332 of a relay 331 is energized and normally closed relay contacts 333 are opened causing the lamps 303 to go off. However, where the lamps 303 also serve as stop lamps, a juncture 303a may be connected to the brake switch (not shown) so that when the brake switch is turned on in this condition the lamps 303 are readily lighted upon depression of the brake pedal (not shown). Then when the vehicle is decelerated rapidly so that the deceleration detector 301a is turned off (opened), a transistor 342 is turned off increasing its collector voltage and a positive differentiated voltage produced by a capacitor 345 and a resistor 346 is applied to the gate of the thyristor 327 turning it on (the resistance of the resistor 346 is considerably large as compared with that of a resistor 344). When this occurs, the astable multivibrator comprising the transistors 321 and 322 starts oscillating with the result that the relay contacts 333 repeat a continuous on-and-off cycle of operations and the lamps 303 are caused to flash on and off in response to the oscillation of the astable multivibrator. In this case, as soon as the deceleration detector 301a is turned off, the transistor 342 is turned off as mentioned earlier, and thereby the monostable multivibrator comprising the transistors 341 and 342 becomes non-stable (the transistor 341 is turned on). Namely, during the time that the base voltage of the transistor 342 decreases to a negative value and then it returns to a positive potential with a time constant determined by the resistor 348 and the capacitor 343, the collector voltage of the transistor 342 remains high and the thyristor 327 remains on causing the astable multivibrator to continue oscillating. However, when the transistor 342 is turned on again so that its collector voltage decreases, the current flowing to the thyristor 327 is now supplied to the transistor 342 through a diode 351 so that the thyristor 327 is turned off and only the transistor 322 is turned on, opening the relay contacts 333 and causing the lamps 303 to go off. On the other hand, after the above time period determined by the resistor 348 and the capacitor 343 has passed and when the positive potential is applied to the base of the transistor 342, the transistor 342 tends to become conductive. However, if the deceleration detector 301a is still turned off under the above conditions (namely after a certain time has passed), the transistor 342 remains non-conductive maintaining the oscillation of the astable multivibrator 302a. Thereafter, when the deceleration detector 301a is closed due to deceleration lower than the predetermined value, the transistor 342 immediately becomes conductive, to thereby stop the oscillation of the multivibrator 302a.

While, in the embodiment of FIG. 8, the collector of the transistor 342 is connected to the anode of the thyristor 327 and the diode 351 to turn off the thyristor 327, it is possible to readily turn off the thyristor 327 by means of a relay which is controlled by the transistor 342. In the Figure, numerals 347, 350, 344, 328, 326 and 330 designate resistors, 325 a diode, 323 and 324 capacitors.

Next, the fourth embodiment wil be described. In FIG. 9, with the normally open deceleration detector 401b in the open position, no positive voltage is applied to the gate of a thyristor 427 and the thyristor 427 remains off causing the lamps 403 to go off in the similar manner as described in connection with the embodiment of FIG. 8. On the other hand, when the deceleration detector 401b is turned on (closed) upon rapid deceleration of the vehicle, a positive voltage is applied to the gate of the thyristor 427 through a resistor 452 and at the same time a transistor 442 is turned on. Consequently, a relay coil 450 of a relay 449 is energized and contacts 451 are closed causing the astable multivibrator comprising transistors 421 and 422 to oscillate and thereby to cause the lamps 403 to flash on and off. In this case, after the deceleration detector 401b has been turned on (rapid deceleration has occurred), if the deceleration detector 401b is turned off immediately, the discharging current from a capacitor 448 flows through a resistor 447 to the base of a transistor 441 as the base current for a predetermined time and the transistor 441 is turned on holding the transistor 442 on. Thus, the relay contacts 451 stay closed and the thyristor 427 remains on causing the lamps to flash on and off. When the discharging current of the capacitor 448 decreases sufficiently so that the transistor 441 is driven into the active region, the transistor 442 is quickly turned off through the feedback circuit (resistor 444) and the relay contacts 451 are opened stopping the oscillation and thereby causing the lamps 403 to go off. While, in the embodiment of this Figure, the thyristor 427 is turned off by means of the relay 449, it is easy to arrange so that the collector of a transistor which is controlled by either of the transistors 442 and 441 is connected to the anode of the thyristor 427 and a current is supplied to the transistor to turn off the thyristor 427 in a similar manner as described in connection with the embodiment of FIG. 8. In the Figure, numerals 446, 443, 445, 426, 428, 429 and 430 designate resistors, 425 a diode, 423 and 424 capacitors, 431 a relay, 432 a coil, 433 relay contacts.

Figure 10:
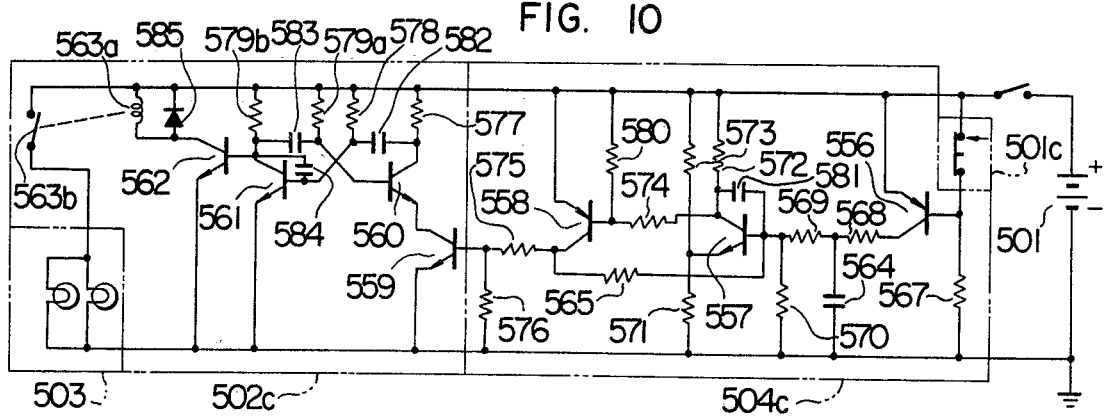
FIG. 10 is a circuit diagram showing a fifth embodiment of the system of this invention.

The fifth embodiment shown in FIG. 10 operates as follows. When the vehicle undergoes no deceleration greater than a predetermined value so that a deceleration detector 501c is on (conductive), a transistor 556 is turned off and no base current flows to a transistor 557 turning it off. When the transistor 557 is turned off, transistors 558, 559 and 560 are turned off.

When the transistor 560 is turned off, a transistor 561 is turned on and a transistor 562 is turned off. Consequently, a relay coil 563a remains de-energized and contacts 563b remain open causing brake lamps 503 constituting warning means to remain off. On the other hand, when the deceleration detector 501c is turned off (opened) due to the occurrence of a rapid deceleration, the transistor 556 is turned on and the transistors 557, 558 and 559 are sequentially turned on. As a result, the multivibrator comprising the transistors 560 and 561 oscillates and the transistor 562 repeates a continuous on-and-off cycle of operations. Consequently, the relay coil 563a is also energized intermittently and the contacts 563b are opened and closed alternately thus causing the brake lamps 503 to flash on and off thereby informing the driver of the following vehicle of the occurrence of a deceleration greater than a predetermined value. In this case, there is possibility that the deceleration detector 501c which has been turned off on rapid deceleration is immediately turned back on. In order to positively signal the occurence of deceleration to the driver of the following vehicle in such a case, it is necessary to maintain the intermittent flashing of the brake lamps for a predetermined time. For this purpose, a capacitor 564 is connected between the collector of the transistor 556 and ground for forming a charging circuit through the emitter-collector path of the transistor 556, the resistor 568, the capacitor 564 and to ground, and also forming a discharging circuit through a resistor 569, the base-emitter path of the transistor 557 and a resistor 571. Accordingly, when the deceleration detector 501c is opened upon rapid deceleration higher than the predetermined value, the transistor 556 is driven into conduction to complete the above charging circuit, whereby the capacitor 564 is charged while the transistor 556 is conductive. And when the detector 501c is closed due to the deceleration lower than the predetermined value, the transistor 556 is made nonconductive, and then the above discharging circuit is formed through the base-emitter path of the transistor 557, whereby the transistor 557 is kept conductive for a certain period of time even after the detector 501c is closed, with the result that the transistors 558 and 559 are held in the conductive state for a predetermined time and the transistors 560 and 561 continue oscillating. Consequently, the brake lamps flash on and off even if the deceleration detector remains on for a predetermined time, thereby allowing a sufficient time for the driver of the following vehicle to ascertain the signal. In this embodiment, the transistors 557 and 558 are connected in Darlington arrangement to ensure an improved gain. The base of the transistor 557 is connected to the collector of the transistor 558 through a resistor 565 to provide positive feedback and thereby to ensure improved switching. In the Figure, numeral 502c designates switching means including an astable multivibrator, 504c a timing circuit such as a delay circuit, 567, 568, 569, 570, 571, 572, 573, 574, 575, 576, 577, 578, 579a, 579b and 580 resistors, 581, 582, 583 and 584 capacitors, 585 an arc suppressing diode, 501 a vehicle battery.

Figure 11:
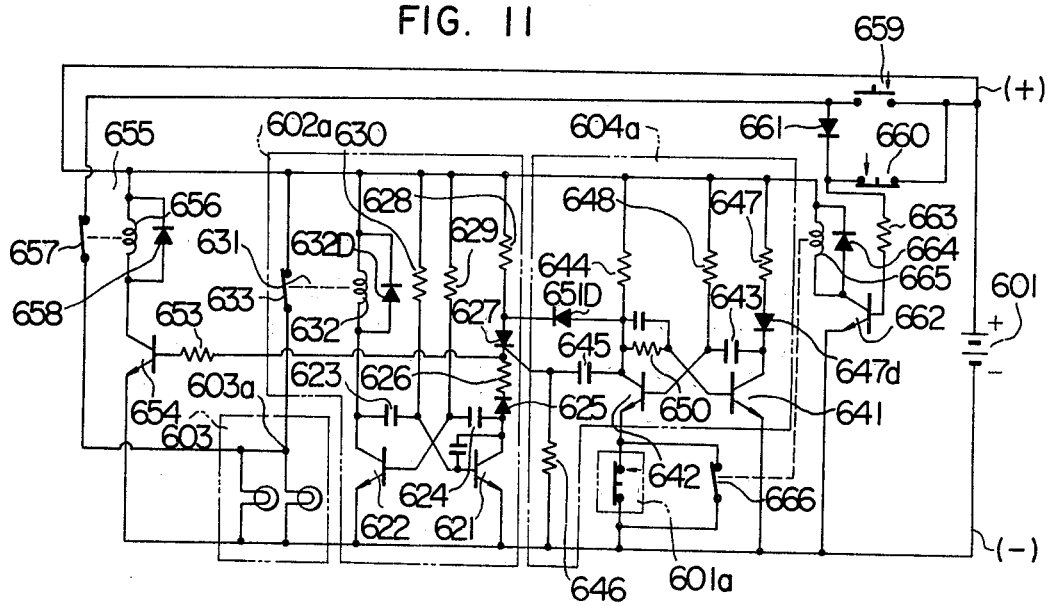
FIG. 11 is a circuit diagram showing a sixth embodiment of the system of this invention.

Referring now to FIG. 11 illustrating a sixth embodiment of the invention, symbols (+) and (−) designate DC input terminals connected to a vehicle battery 601. The deceleration indicating system according to this embodiment comprises an acceleration switch 660 constituting accelerator switching means which is turned off in response to the depression of the accelerator pedal, a brake switch 659 constituting brake switching means which is turned on in response to the depression of the brake pedal, and cancellation switching means including diodes 661 and 664, a resistor 663, a transistor 662, a relay coil 665 and contacts 666. Numeral 601a designates a deceleration detector which may be a known type of pendulum G sensor that is actuated by the force of inertia, a G sensor employing mercury or the like. Numeral 602a designates flickering switching means comprising a multivibrator, 603 brake lamps constituting indicating means, 604a a timing circuit comprising a monostable multivibrator, 655 a relay, 654 a transistor connected in series with the relay 655.

With the construction described above, under normal driving conditions of the vehicle, when the accelerator pedal is depressed so that the acceleration switch 660 is turned off, the transistor 662 is turned off and the relay coil 665 is not energized. Therefore, the contacts 666 are kept closed, whereby even if the detector 601a (G sensor) is turned off the transistor 642 remains on decreasing its collector voltage and a thyristor 627 is not turned on. Consequently, only one transistor 622 of the transistors constituting the multivibrator is turned on so that a relay coil 632 is energized and its contacts 633 are opened holding the lamps 603 off. Since the thyristor 627 is off, the transistor 654 is also off. Since the contacts 657 of the relay 655 are closed, the depression of the brake pedal closes the switch 659 and the lamps 603 are energized and lighted through the contacts 657.

On the other hand, even if the acceleration switch 660 is erroneously turned off simultaneously with the closing of the switch 659 on rapid braking, a current is supplied to the base of the transistor 662 is turned on and the contacts 666 are opened. Consequently, the detector 601a is turned off upon rapid deceleration and a signal is applied to the gate of the thyristor 627 to thereby drive it into conduction. Thus, the multivibrator comprising the transistors 621 and 622 starts oscillating and the contacts 633 are opened and closed alternately causing the lamps 603 to flash on and off in response to the oscillation of the multivibrator. At that time, the transistor 654 is turned on opening the contacts 657 and thus there is no possibility of the lamps being lighted continuously through the contacts 657 even if the switch 659 is in the closed position. In this case, even if the G sensor 601a is immediately turned back on, due to the fact that the transistors 641 and 642 constitute a monostable multivibrator, the intermittent flashing of the lamps is continued until the transistor 642 is turned back on and the anode voltage of the thyristor 627 drops sufficiently.

While, in the embodiment described above, the conduction of the thyristor 627 is stopped by the transistor 642, the conduction of the thyristor 627 may be easily stopped by means of a relay.

Figure 12:
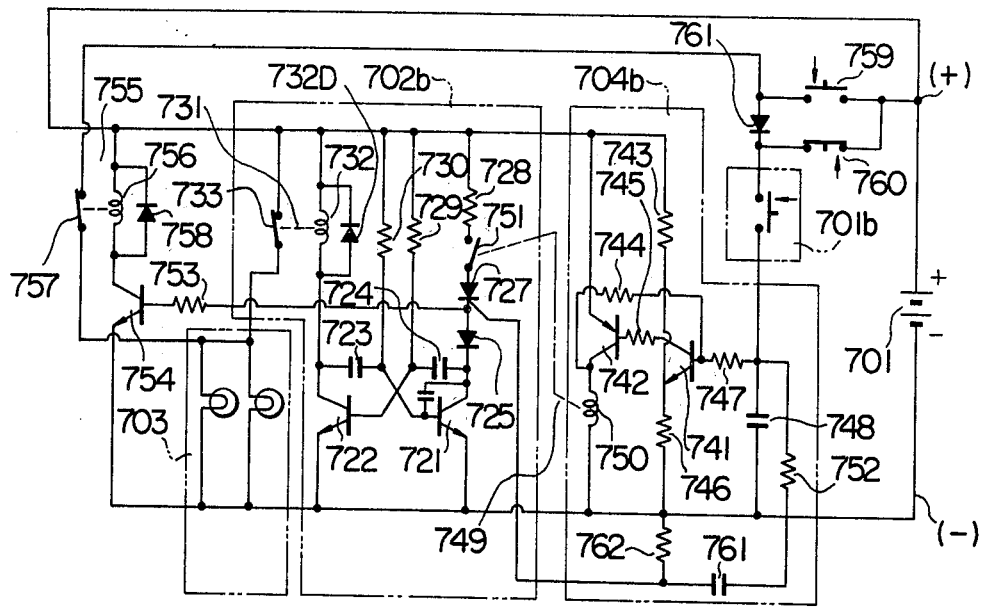
FIG. 12 is a circuit diagram showing a seventh embodiment of the system of this invention.

Next, the seventh embodiment shown in FIG. 12 will be described. In this embodiment, an OR circuit itself which comprises a brake switch 759 and an acceleration switch 760 is used as cancellation switching means and this cancellation switching means is connected in series with a normally open G sensor 701b. In the Figure, numeral 704b designates a timing circuit such as a delay circuit whereby even if the G sensor 701b is turned off immediately after it has been turned on, not only a transistor 741 but a transistor 742 is held on for a while by the discharge of a capacitor 748 to stabilize the operation. In FIG. 12, under normal driving conditions of the vehicle with the accelerator pedal being depressed, when the switch 760 is turned off (the accelerator pedal alone is depressed), irrespective of whether the deceleration detector 701b (G sensor) is operated erroneously, the capacitor 748 is not charged and the transistors 741 and 742 are off. Thus, a coil 750 of a relay 749 is not energized and contacts 751 are open. Consequently, only a transistor 722 of an astable multivibrator is turned on with the result that a coil 732 of a relay 731 is energized and contacts 733 are opened preventing lamps 703 from flashing or lighting up through the contacts 733. Since a thyristor 727 is off, a transistor 754 is turned off and contacts 757 remain closed. In this condition, when the accelerator pedal is released and the brake switch 759 is turned on, the lamps 703 are energized through the contacts 757 and the lamps 703 light up.

Then, when the accelerator pedal is depressed erroneously simultaneously with the turning on of the brake switch 759 on rapid braking, while the switch 760 is opened, the detector 701b is turned on through a diode 761 so that the capacitor 748 starts charging and the transistors 741 and 742 are turned on closing the contacts 751 and simultaneously supplying a positive potential to the gate of the thyristor 727 thereby turning it on. Consequently, the transistors 721 and 722 of the multivibrator start oscillating and the contacts 733 are opened and closed alternately causing the lamps 703 to flash on and off. Since the transistor 754 is conducting during the oscillation of the multivibrator, the relay contacts 757 are opened thus preventing the flow of current from the brake switch 759 to the lamps 703 through the relay contacts 757.

In this case, even if the detector 701b is turned off immediately after it has been turned on, due to the discharging current of the capacitor 748 flowing to the transistor 741, the transistor 741 is held on for a while until the charge on the capacitor 748 decreases below a predetermined value, whereby the intermittent flashing of the lamps 703 is continued until the transistor 742 is turned off causing the relay contacts 751 to open. While, in this embodiment, the relay 749 (the coil 750 and the contacts 751) is used for stopping the conduction of the thyristor 727, it is of course possible to stop the conduction of the thyristor 727 by means of another transistor which is controlled by the transistors 741 and 742.

In FIGS. 11 and 12, numerals 626, 726, 628, 728, 629, 729, 630, 730, 643, 743, 644, 744, 645, 745, 646, 746, 647, 747, 648, 748, 652, 752, 662, 762 and 663, 763 designate resistors, 625, 725, 632D, 732D, 647D, 747D, 651D, 751D, 658, 758 and 664, 764 diodes, 623, 723, 624, 724, 643, 743, 645, 745 and 661, 761 capacitors, 603a and 703a junctures, 655 and 755 relays, 656 and 756 relay coils.

With the embodiments illustrated in FIGS. 11 and 12, where the operation of the G sensor is accompanied by only the operation of the acceleration switch in response to the depression of the accelerator pedal to a predetermined amount, no deceleration signal (intermittent flashing of brake lamps) is generated. The effect of this is that there is less danger of giving erroneous indications due, for example, to any erroneous operation of the G sensor (e.g., the G sensor or deceleration detector tends to be operated erroneously on sudden acceleration or while the vehicle is running on a rough road). On the other hand, when the brake pedal is depressed or when both the brake pedal and the accelerator pedal are depressed erroneously, the required deceleration signaling is immediately made by the operation of the G sensor. As a result, the danger of giving erroneous deceleration indication is reduced considerably with resulting improvement in the reliability of the deceleration indicating system.

Figure 13:
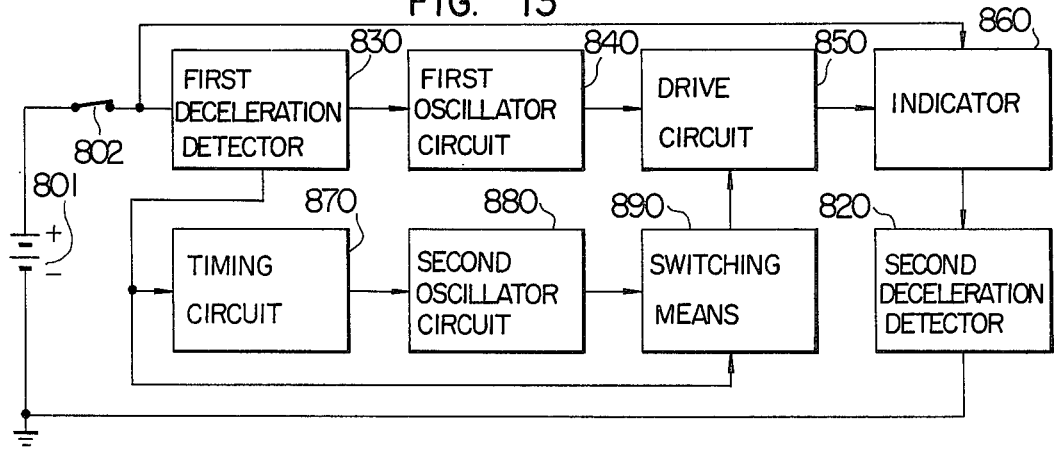
FIG. 13 is a block diagram showing an eighth embodiment of the system of this invention.

The system of this invention will now be described with reference to the illustrated eighth embodiment. In FIG. 13 illustrating the eighth embodiment in block diagram form, numeral 801 designates a battery, 802 an ignition switch, 830 a first deceleration detector which is turned on in response to a deceleration greater than a predetermined value and whose resistance value or output varies in accordance with the value of deceleration. Numeral 840 designates a first oscillator circuit whose frequency is varied in accordance with the resistance value of the first deceleration detector 830, 850 a drive circuit which is switched on and off in accordance with the output signal of the first oscillator circuit 840, 820 a second deceleration detector (this is not absolutely needed) whose resistance value varies with the value of deceleration, 860 an indicator comprising lamps which are lighted by the drive circuit. Numeral 870 designates a timing circuit charging means of which charges when the first deceleration detector 830 is turned on and discharges when the first deceleration detector 830 is turned off for acting as a delay circuit, 880 a second oscillator circuit which oscillates at a predetermined frequency during the time that the timing circuit 870 is in operation, 890 switching means whereby the transmission of the output signal of the second oscillator circuit 880 to the drive circuit 850 is prevented when the first deceleration detector 830 is turned on and the output signal is transmitted to the drive circuit 850 when the first deceleration detector 830 is turned off. The fact that this embodiment comprises the first and second oscillator circuits in place of a single oscillator circuit has the following effect. Namely, when the first deceleration detector 830 (e.g., a pendulum variable resistor) comes into operation on rapid deceleration, for example, so that the first oscillator circuit 840 starts oscillating in response to the output resistance of the first deceleration detector 830 and the brake lamps constituting the indicator 860 are caused to flash on and off at a period corresponding to the value of the rapid deceleration, due to the fact that the time during which the first deceleration detector 830 is held in the operated condition (e.g., the pendulum maintains a predetermined amount of displacement) is very short, there is possibility that the drivers of other vehicles is not provided with a sufficient time to ascertain the information. With the present embodiment, however, if the first deceleration detector 830 is brought out of operation before the required predetermined time for ascertaining information terminates, the output of the second oscillator circuit 880 is immediately introduced to the drive circuit 850 through the switching means 890 maintaining the on-and-off cycle of operations of the indicator 860.

Figure 14:
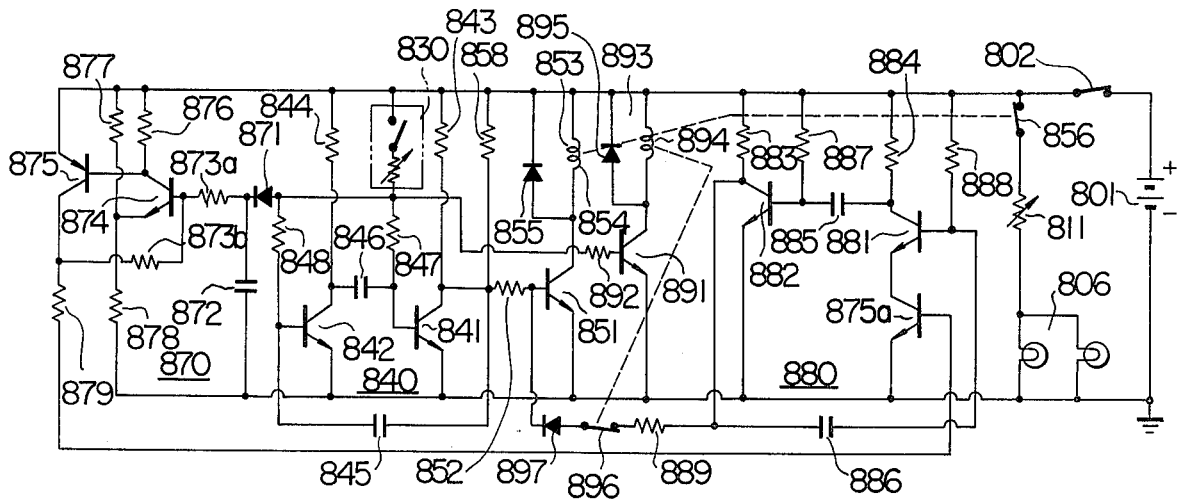
FIG. 14 is a detailed circuit diagram for the eighth embodiment shown in FIG. 13.

The operation of this embodiment will now be described in greater detail with reference to FIGS. 13 and 14. When the vehicle has no deceleration, the first deceleration detector 830 is turned off and the base current to transistors 841 and 842 of the first oscillator circuit 840 is cut off preventing the first oscillator circuit 840 from oscillating. Since the transistor 841 is nonconductive, the base current is supplied to a transistor 851 of the drive circuit 850 through resistors 858 and 852 turning the transistor 851 on, whereby a coil 854 of a relay 853 is energized opening normally closed contacts 856. Thus, lamps 806 are not lighted. In other words, when there is no great deceleration, the lamps go off. At this time, the charging of a capacitor 872 also does not take place and transistors 874 and 875 are all off. And a transistor 875a is nonconductive, too. Consequently, a transistor 881 of the second oscillator circuit 880 is turned off and thus the second oscillator circuit 880 does not oscillate. Simultaneously a transistor 891 is turned off due to the opened state of the detector 830 and a coil 894 of a relay 893 is not energized. Thus, while normally closed contacts 896 are held in the closed position, a transistor 882 produces no electrical effect on the transistor 851 by virtue of a blocking diode 897 even though the transistor 882 is conductive. When subjected to a deceleration greater than the predetermined value, particularly the first deceleration detector 830 is turned on and the first oscillator circuit 840 comprising the transistors 841 and 842 starts oscillating at a period corresponding to the value of the deceleration with the time constants determined by a resistor 847 and a capacitor 846 as well as a resistor 848 and a capacitor 845. Since the collector of the transistor 841 of the first oscillator circuit 840 is connected through a resistor 852 to the base of the transistor 851 of the drive circuit 850, the transistor 851 is turned on and off alternately so that the contacts 856 of the relay 853 are opened and closed alternately and the lamps 806 are caused to flash on and off with an intensity inversely proportional to the resistance value of the second deceleration detector 820. When the first deceleration detector 830 is turned on, namely, when the resistance value decreases from the infinity to a lower value, the capacitor 872 is charged through a diode 871 with the time constant determined by the capacitor 872 and the resistance of the detector 830 and simultaneously the base current flows to the transistor 874. Consequently, the transistors 875 and 875a are also turned on and one of the transistors of the second oscillator circuit 880 or the transistor 881 is also turned on causing the second oscillator circuit 880 to start oscillating with the time constants determined by a resistor 884 and a capacitor 885 as well as a resistor 883 and a capacitor 886. In this case, the transistor 891 is kept conductive through the first deceleration detector 830 and a resistor 892 so that the coil 894 of the relay 893 is energized and contacts 896 constituting the switching means 890 are opened preventing the output signal of the second oscillator circuit 880 from being transmitted to the drive circuit 830. When eventually the point is reached where the first deceleration detector 830 is turned off, namely, when the resistance value rises from the low value to one greater than a predetermined value, the transistor 891 is turned off closing the relay contacts 896. When this occurs, namely the detector 830 is turned off the charge stored on the capacitor 872 begins to discharge through the resistor 873a and the base-emitter path of the transistor 874. As a result, the transistors 874, 875 and 875a are all held on for a while despite the turning off of the first deceleration detector 830 and the second oscillator circuit 880 continues to oscillate so far as the transistor 875a is kept conductive. Consequently, the transistor 851 constituting the drive circuit 850 is turned on and off alternately by base trigger signals from the oscillator circuit 880 through the contacts 896 and the diode 897 causing the lamps 806 to flash on and off in response to the oscillation of the second oscillator circuit 880. Eventually the charge on the capacitor 872 decreases to a predetermined level and the transistors 874, 875 and 875a are turned off stopping the oscillation of the second oscillator circuit 880 and thereby restoring it to the initial conditions. A resistor 873b of the timing circuit 870 is a positive feedback resistor, diodes 855 and 895 are arc suppressing diodes, and numerals 843, 844, 876, 877, 878, 879, 887, 888 and 889 designate resistors.

While, in the embodiment described above, the oscillator circuit is divided into two, i.e., the first and second oscillator circuits, it is possible to use a single oscillator circuit in which case it is necessary to arrange so that when the output (resistance value) of the deceleration detector becomes lower than a predetermined value while the timing circuit is in operation, that is, before the termination of the required indication time, the switching means instantly connects the power source to the input of the oscillator circuit through a resistor having a predetermined resistance value. Further, the oscillator circuit may comprise a known type of flasher circuit including a capacitor and a relay coil.

Furthermore, the deceleration detector whose output varies with the magnitude of deceleration may be of a type in which a pendulum is attached to the rotary shaft of a known type of variable resistor so that the pendulumn swings in accordance with the deceleration thereby varying the resistance value. Other types of deceleration detector may also be used, such as one employing a variable capacitance type capacitor to utilize variation of the capacitance as variation of the output or another employing a differential transformer to vary the voltage output thereby controlling the oscillation frequency in accordance with variations of the output.

Figure 15:
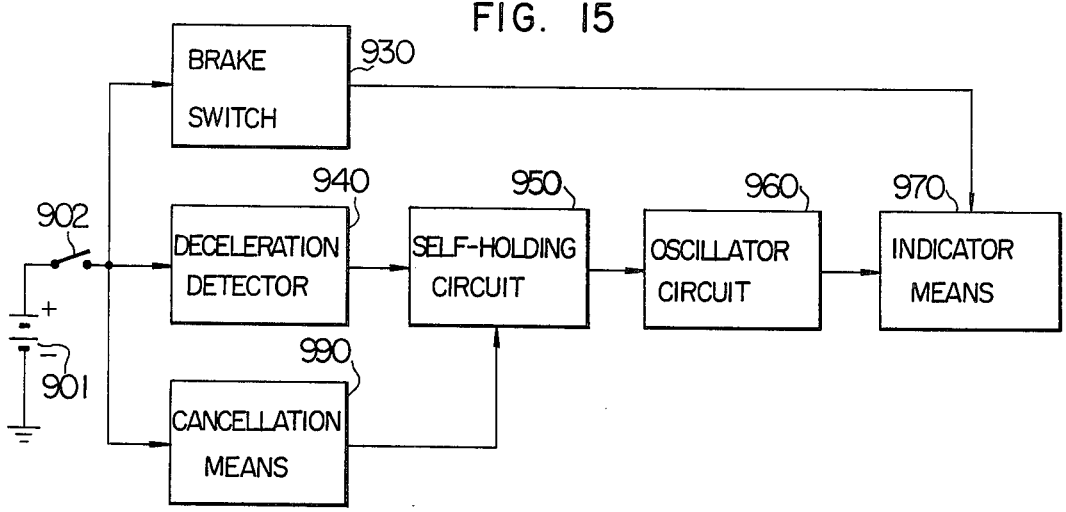
FIG. 15 is a block diagram showing a ninth embodiment of the system of this invention.

A ninth embodiment of the system of this invention will now be described with reference to the drawings. In FIG. 15 showing the ninth embodiment in block diagram form, numeral 901 designates a vehicle battery, 902 an ignition switch, 930 a brake switch which is turned on in response to the depression of the brake pedal and is turned off in response to the releasing of the brake pedal, 940 a deceleration detector which comes into operation under rapid deceleration greater than a predetermined value, 950 a self-holding circuit which comes into operation in response to the operation of the deceleration detector 940 and remains in the operated condition even after the deceleration detector 940 is brought out of operation, 960 an oscillator circuit which oscillates at a predetermined period when the self-holding circuit 950 is in operation, 970 indicator means which is switched on and off in accordance with the output signal of the oscillator circuit 960, 990 cancellation means for releasing the self-holding action of the self-holding circuit 950. a With the construction described above, in the normal condition the indicator means 970 operates in accordance with the turning on and off of the brake switch 930, whereas on rapid deceleration the deceleration detector 940 comes into operation so that this is memorized by the self-holding circuit 950 and the indicator means 970 is switched on and off alternately by the oscillator circuit 960 until the self-holding circuit 950 is cancelled by the cancellation means 990.

Figure 16:
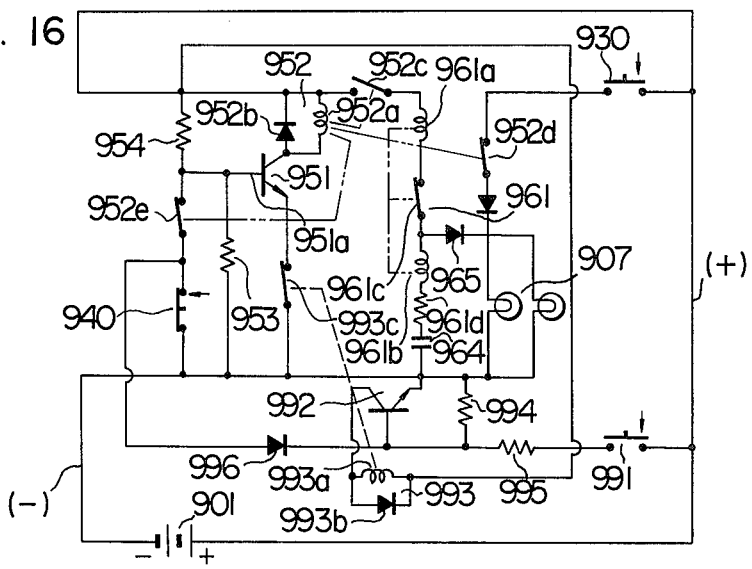
FIG. 16 is a detailed circuit diagram for the ninth embodiment shown in FIG. 15.
Figure 17:
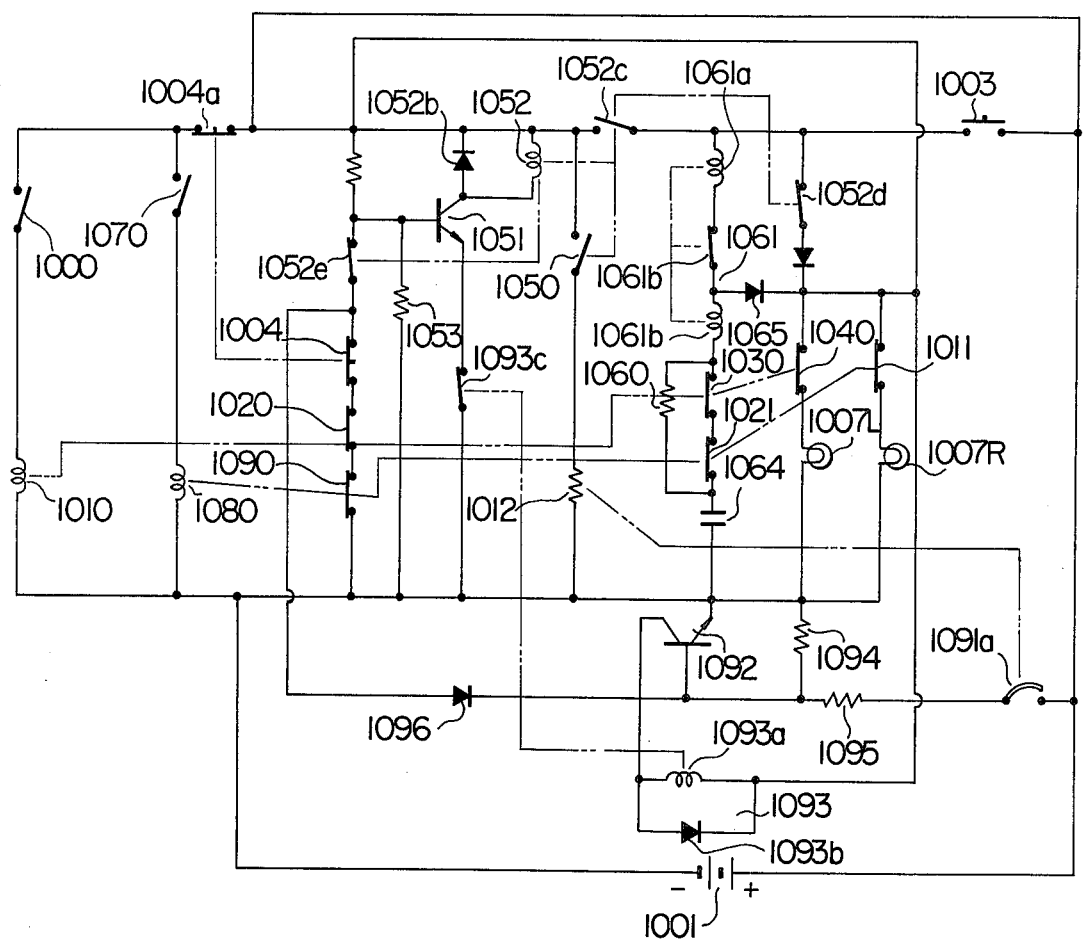
FIG. 17 is a circuit diagram showing a tenth embodiment of the system of this invention.

The operation of the ninth embodiment will now be described in greater detail with reference to FIG. 16. In the Figure, under normal driving conditions of the vehicle or when the vehicle is at rest, the deceleration detector 940 is closed so that a transistor 951 is turned off due to the grounding of its base 951a and a coil 952a of a relay 952 is not energized holding contacts 952c, 952d and 952e in the "open", "closed" and "closed" positions, respectively. Consequently, the flow of current to coils 961a and 961b of a relay 961, contacts 952c and a capacitor 964 is cut off by the contacts 952c and in this condition lamps 907 are not lighted unless the brake switch 930 comes into operation. When a switch 991 which is operable in response to the depression of the accelerator pedal is turned on, a coil 993a of a relay 993 is energized since the transistor 992 is made conductive due to a base current from the battery 901 through the switch 991 and a resistor 995. Though the contacts 993c are opened by the energization of the coil 993a, the transistor 951 is not affected no longer, that is, the transistor 951 is kept nonconductive. Thereby, the de-energization of the relay coil is not changed and hence it is all the same that the lamps 907 are lighted only upon operation of the brake switch 903.

On the other hand, when the vehicle has a deceleration greater than a predetermined value, the deceleration detector 940 is turned off so that the base current is supplied to the base 951a of the transistor 951 through a resistor 954 turning the transistor 951 on and the coil 952a of the relay 952 is energized placing the contacts 952c, 952d and 952e in the "closed", "opened" and "opened" positions, respectively. Once the contacts 952e have been opened, even if the deceleration detector 940 is thereafter restored to its original position (closed position) and turned back on, this does not affect the supply of the base current to the transistor 951 (due to the opening of the contacts 952e) and thus the coil 952a is held energized holding the relay 952 in the operated position. Since the contacts 952c are now closed, a current flows through the current coil 961a and the contacts 961c to the lamps 907 (the lamps 907 go on) and the current also flows to the capacitor 964 through the voltage coil 961b. Since the current coil 961a and the voltage coil 961a are arranged so that the magnetomotive forces induced therein are opposite to each other, the magnetomotive forces induced in the coils 961a and 961b cancel each other and the contacts 961c remain closed. However, because the capacitor 964 is charged with the time constant determined by the capacitor 964, a resistor 961d and the resistance of the coil 961b, when the capacitor 964 is charged to a certain level so that the current flows no longer to the coil 961b, the contacts 961c are opened by the magnetomotive force induced in the coil 961a whereby the lighting of the lamps 907 ceases. At the same time the charge on the capacitor 964 is discharged through the voltage coil 961b and the lamps 907, however, since the resistance of the voltage coil 961b is large, the discharging current flowing to the lamps 907 is small and thereby the lamps 907 are not lighted by this discharging current. When the discharging current decreases so that the contacts 961c are changed from the open position to the closed position by means of the resultant magnetomotive force of the voltage coil 961b and the coil 961a, the current again flows to the current coil 961a and the capacitor 964 and so the oscillations are produced causing the lamps 907 to flash on and off. At this time, even if the brake switch 903 is turned on, the opening of the contacts 952d prevents the current from flowing through the lamps 907. Accordingly, the lamps 907 continue to flash on and off by the oscillations of the contacts 961c as mentioned above. Thereafter, when the driver depresses the accelerator pedal for accelerating purposes after safety has been ascertained, the switch 991 constituting the cancellation means is turned on so that a transistor 992 is turned on because of the base current from the battery through the switch 991 and the resistor as in the same manner as above and the coil 993a of the relay 993 is energized opening the contacts 993c. Consequently, the transistor 951 is turned off and the relay 952 is turned off thus placing the contacts 952c, 952d and 952e respective in the "open", "closed" and "closed" positions thereby stopping the oscillation of the contacts 961c and restoring the oscillator circuit to the initial conditions. In the Figure, symbols (+) and (−) designate respectively the positive and negative terminals of the vehicle battery 901, 953, 994 and 995 resistors, 952b, 993b and 996 diodes. Numeral 961d designates a resistor whose resistance value may be varied in accordance with the value of deceleration to control the period of the on-and-off operations of the indicator means and thereby to generate the required deceleration signal more clearly and accurately. Further, the cancellation means may comprise the timing contacts of a timer. More specifically, in FIG. 16, the timer is energized through the normally open contacts which are responsive to the energization of the relay 952 and the acceleration switch 991 is replaced with on-delay contacts which are closed after a predetermined time.

Furthermore, where it is desired to make the brake lamps also serve as the turn signal flasher, the system of this invention may be constructed as shown in FIG. 7 showing a tenth embodiment of the invention. Referring to the Figure, when a right turn switch 1000 is turned on, a relay 1010 is energized and normally closed contacts 1020, 1030 and 1040 are opened. Consequently, even if a deceleration detector 1004 is not opened, a relay 1052 is energized and self-holds it so that normally open contacts 1050 and 1052c are closed and a filicker relay 1061 is energized. In this case, a timing resistor 1060 is connected in series with a capacitor 1064 and only a lamp 1007R on the right is caused to flash on and off at a slow period. When a left turn switch 1070 is turned on, a relay 1080 is energized and normally closed contacts 1090, 1021 and 1011 are opened causing only a left lamp 1007L to flash on and off. At the expiration of a predetermined time, a bimetal switch 1091a is turned on by the heating of a resistor 1012 and a transistor 1092 is turned on. As a result, normally closed contacts 1093c of a relay 1093 are opened and a transistor 1051 is turned off restoring the initial conditions. Then, when the deceleration detector is turned off, contacts 1004 are opened and both of the lamps are caused to flash on and off. In this case, the timing resistor 1060 is short-circuited causing the lamps to flash on and off at a shorter period. The other component elements are identical or equivalent to those which are designated by the like numerals in FIG. 16. While, in this embodiment, the relays 1010 and 1080 are de-energized by the opening of contacts 1004a which are linked to the contacts 1004 of the deceleration detector, the effect of this is that the right and left lamps are caused to flash on and off at a shorter period on rapid deceleraton even when the turn signal is in operation.

Figure 18:
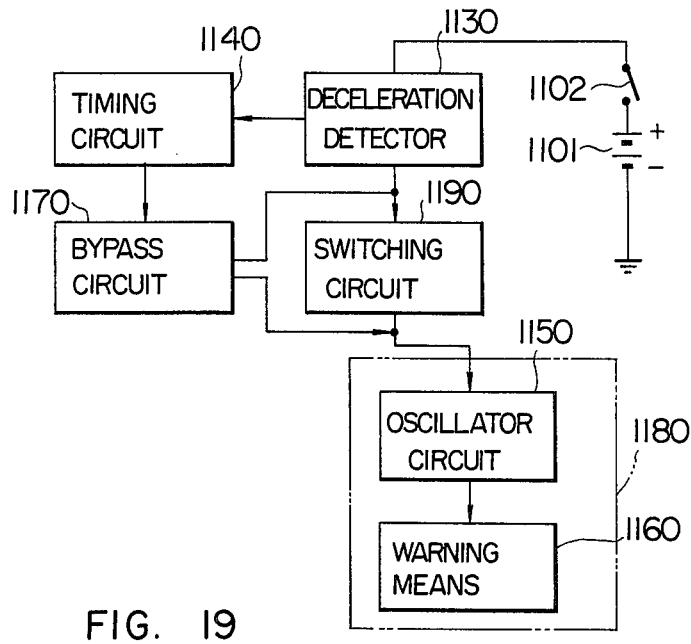
FIG. 18 is a block diagram showing an eleventh embodiment of the system of this invention.

Referring now to the block diagram of FIG. 18 showing an eleventh embodiment, numeral 1101 designates an automobile DC power source, 1102 are ignition switch, 1130 a deceleration detector, 1140 a timing circuit, 1150 and 1160 an oscillator circuit and warning means constituting an indicator circuit 1180, 1170 a bypass circuit, 1190 a switching circuit. With the construction described, during short period deceleration the deceleration detector 1130 is turned on (e.g., an erroneous operation due to irregularities in the road) so that the switching circuit 1190 is turned on and the indicator circuit 1180 gives an indication for a short time. On the other hand, during long period deceleration detector 1130 is turned on so that the timing circuit 1140 switches on the bypass circuit 1170 for a predetermined time and the indicator circuit 1180 gives an indication for a period of time sufficient for ascertaining the information.

Figure 19:
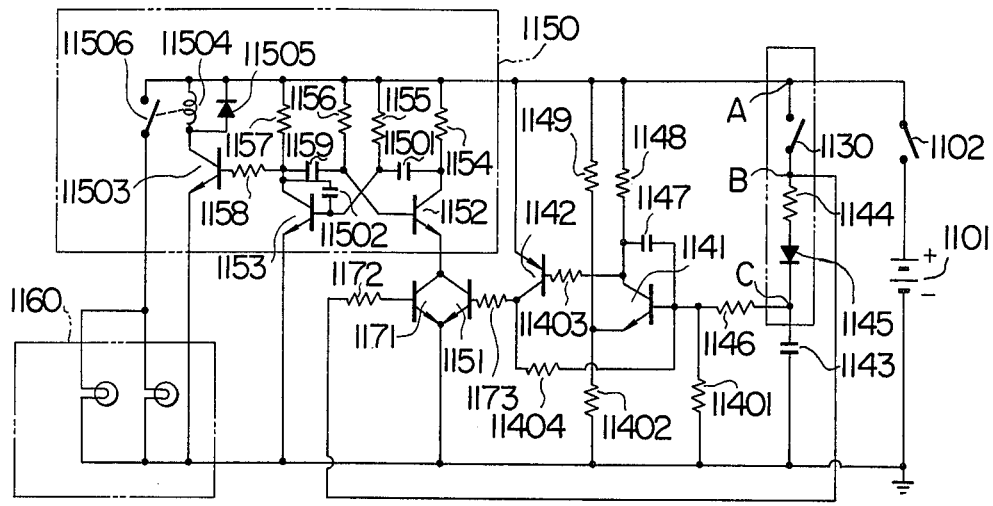
FIG. 19 is a detailed circuit diagram for the eleventh embodiment shown in FIG. 18.

Referring now to FIG. 19, the operation of the eleventh embodiment of the invention will be described in greater detail. With the ignition switch 1102 turned on, when the deceleration detector 1130 (normally open) is in the open position, namely, when there is no deceleration greater than a predetermined value, transistors 1141 and 1142 as well as a transistor 1151 are off and also a transistor 1171 is off thus turning off transistor 1152 of the oscillator circuit 1150. Consequently, the collector voltage of the transistor 1153 rises and the base current flows to the transistor 1153 forcibly turning it on. As a result, a driving transistor 11503 is turned off and a relay coil 11504 is not energized holding normally open contacts 11506 in the open position. Thus, lamps 1160 are not lighted.

Then, when the deceleration detector 1130 is turned on under rapid deceleration, the transistor 1171 (constituting the switching circuit along with a resistor 1172) is instantly turned on along with the transistor 1152 so that the collector current flows to the transistor 1152 turning it on and the transistors 1152 and 1153 start oscillating thus closing and opening the contacts 11506 alternately thereby causing the lamps 1160 constituting the brake lamps to flash on and off. On the other hand, when the detector 1130 is turned on, the voltage on a capacitor 1143 which constitutes an integrating circuit along with a resistor 1144, is increased gradually. In this case, however, if the detector 1130 is turned off before the capacitor voltage rises sufficiently to turn the transistor 1141 on, the transistor 1171 is immediately turned off so that since the transistor 1151 is also off at this time the oscillation is stopped immediately. On the contrary, if the voltage on the capacitor 1143 is allowed to rise sufficiently to turn on the transistor 1141, even after the transistor 1171 has been turned off due to the turning off of the detector 1130, the transistor 1141 is allowed to remain on until the discharging current from the capacitor 1143 decreases to a value which is sufficiently low to turn off the transistor 1141 and consequently the transistors 1142 and 1151 are held on thus causing the oscillator circuit 1150 to continue oscillating thereby causing the lamps 1160 to continue to flash on and off. In the Figure, symbols A, B and C designate terminals, 1101 a battery, 1146, 1148, 1149, 11401, 11402, 11403, 11404, 1154, 1155, 1156, 1157, 1158 and 1173 resistors, 1147, 1159, 11501 and 11502 capacitors, 1145 and 11505 diodes.

Figure 20:
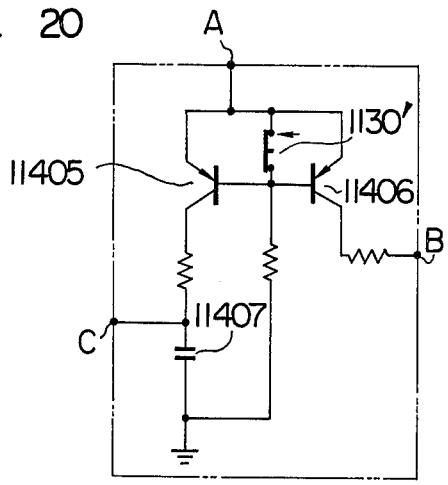
FIG. 20 is a circuit diagram showing a modified form of the deceleration detecting section in the embodiment shown in FIG. 19.

FIG. 20 illustrates a modified form of the deceleration detecting section shown in FIG. 19, in which the deceleration detector 1130 is replaced with a normally closed deceleration detector 1130', and the terminal symbols A, B and C of FIG. 19 respectively correspond to symbols A, B and C of FIG. 20. Since the detector 1130' is normally closed, transistors 11405 and 11406 are off so that a capacitor 11407 is not charged and the base current is not supplied to the transistor 1171 through the terminal B producing no oscillations of the oscillator circuit 1150. When the detector 1130' is opened, the transistors 11405 and 11406 are turned on because the emitter-base current through the both transistors 11405 and 11406 become sufficient to drive them into conduction. The operation that follows is the same as described in connection with FIG. 19.

While, in the above-described eleventh embodiment, the indicator circuit is designed so that the lamps are caused to flash on and off through the oscillator circuit, it is of course possible to light other lamps, cause the lamps to change colors or use an indicator circuit designed so that the brightness of the lamps is varied. Further, the deceleration detector may be of a variable resistor type whose internal resistance is varied with the value of deceleration.

Figure 21:
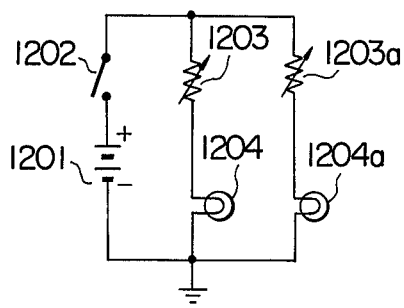
FIG. 21 is a circuit diagram showing a twelfth embodiment of the system of this invention.
Figure 22:
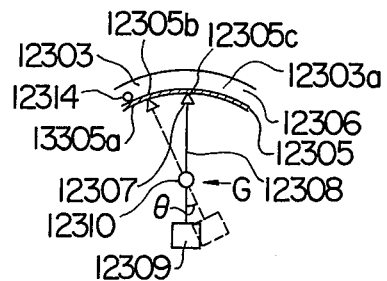
FIG. 22 is a front view showing schematically the deceleration detector used in the twelfth embodiment shown in FIG. 21.
Figure 23:
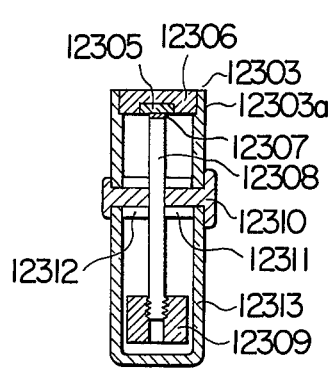
FIG. 23 is a side sectional view of the deceleration detector shown in FIG. 22.

FIG. 21 illustrates a circuit diagram for a twelfth embodiment of the invention. In the Figure, numeral 1201 designates a battery, 1202 an ignition switch, 1203 and 1203a variable resistors whose resistance values are varied with the values of acceleration and deceleration, 1204 and 1204a indicator lamps mounted on the rear and front of the vehicle. FIGS. 22 and 23 are schematic diagrams showing an embodiment of the variable resistors 1203 and 1203a. In the Figures, numeral 12305 designates a carbon material deposited by baking on a spherical plastic plate 12306, 12308 a metal arm rotatable about a shaft 12310 serving as a fulcrum and having a contact 12307 soldered to the forward end thereof for engagement with the carbon material 12305. Numeral 12309 designates a metal weight attached to the other end of the arm 12308, 12311 and 12312 metal collars, 12313 an iron support for supporting the shaft 12310 and the plastic plate 12306 and also serving as an electrode, 12314 a lead wire leading from a portion 12305a of the carbon material 12305.

With the construction described above, when the vehicle undergoes deceleration in the direction of an arrow G during collision or rapid braking as shown in FIGS. 22 and 23, the weight 12309 is moved in accordance with the value of the deceleration so that the arm 12308 is rotated by $\theta$ about the shaft 12310 serving as the fulcrum and consequently the contact 12307 normally in contact with a portion 12305c of the carbon material 12305 is moved to a portion 12305b. Consequently, the resistance of the two electrodes 12313 and 12314 which was corresponding to the length of the carbon material between the portions 12305a and 12305c in the initial condition where the contact 12307 was in contact with the portion 12305c, is now reduced by an amount corresponding to the length of the carbon material between the portions 12305b and 12305c and the brightness of the lamp 1204 mounted on the rear of the vehicle is increased as shown in FIG. 21 by an amount corresponding to the change in the resistance. By selecting the thickness, width and concentration of the carbon material so that the resistance value in the initial condition of the carbon material 12305 (where the contact 12307 is contacting the portion 12305c) is large, the lamps 1204 and 1204a may be easily caused to go off under the normal driving conditions (the lamps remain off).

On the other hand, when the vehicle is accelerated, the weight 12309 is caused to swing in the reverse direction and thus the indicator lamp 1204a on the front of the vehicle is caused to light up through the variable resistor 12303a with an intensity corresponding to the value of the acceleration.

Figure 24:
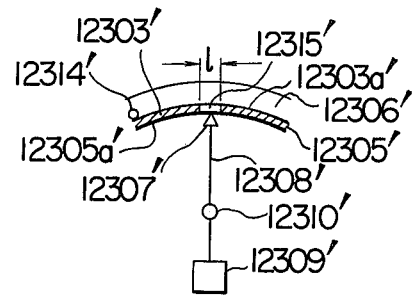
FIG. 24 is a front view showing schematically a modified form of the deceleration detector used in the embodiment shown in FIG. 21.

A modified form of the above-described variable resistor will now be described with reference to FIG. 24. In this modified form, a carbon material 12305' is provided at its central portion with an insulating sheet 12315', so that under the normal driving conditions the circuit for supplying current to the lamps 1204 and 1204a is switched off positively causing the lamps 1204 and 1204a to go and remain off. By suitably selecting the length l of the insulating sheet 12315', the value of acceleration and deceleration for causing the lamps 1204 and 1204a to go on may be determined.

Figure 25:
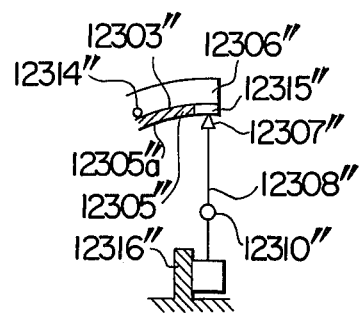
FIG. 25 is a front view showing schematically another modification of the deceleration detector used in the embodiment of FIG. 21.

Still another modification of the variable resistor will now be described with reference to FIG. 25. The variable resistor of FIG. 25 is designed for use in cases where only the detection of deceleration is required (it is suffice to consider deceleration during collision or rapid braking in one direction only) and one side of a carbon material 12035" is therefore eliminated, with a stopper 12316" being provided as a precaution against possible occurrence of deceleration in the other direction or acceleration. With this type of variable resistor, the lamp 1204a shown in FIG. 21 is not needed. In addition to the lamp or lamps, the indicator means may comprise a buzzer, horn or the like solely or in combination with the lamp or lamps.

A thirteenth embodiment of the system of this invention will now be described.

The general construction of this embodiment will be described first with reference to the block diagram of FIG. 26, in which numeral 13100 designates a deceleration detector (hereinafter referred to as a G sensor) which is turned on in response to low deceleration 13200 a G sensor which is turned on in response to intermediate deceleration, 13300 a time interval discriminator which is turned on in response to high deceleration, namely, it comes into operation when the time difference between the times of the turning on of the G sensors 13100 and 13200 becomes smaller than a predetermined value. Numeral 13400 designates oscillator means comprising oscillator circuits 13410, 13420 and 13430 having different oscillation frequencies. For instance, the oscillator circuit 13410 oscillates on low deceleration to turn on and off an indicator 13260 at a low oscillation frequency, while the G sensor 13200 is operated under higher deceleration to produce oscillations at a higher frequency and thereby to more intensively call an attention. In addition, there is provided variable output means 13500 including a variable resistor 13250 whose resistance value is changed in accordance with the value of deceleration, for example, so that the voltage applied to the indicator 13260 is increased in proportion to the value of deceleration. For instance, where the indicator 13260 comprises a lamp or lamps, the shortness of the flashing period and brightness quantitatively indicate the value of the deceleration which the vehicle undergoes. Further, while the variable output means 13500 may consist of only the variable resistor 13250, if the indicator comprises a lamp, the variable output means 13500 may comprise the variable resistor 13250 in combination with outside illumination detecting means 13270 that will be described later or alternately if may consist of only the outside illumination detecting means 13270. While the outside illumination detecting means 13270 may be simply comprised of a manual switch which is operated for day-night switching purposes by the driver, it may also comprise a known type of automatic flasher unit in which case the voltage applied to the indicator 13260 or the number of indicator lamps is adjusted so that the output of the indicator 13260 increases as the outside illumination intensity decreases. In this way, the operating period and output of the indicator 13260 are controlled in accordance with the value of deceleration with or without the outside brightness as an additional control element thus quantitatively and clearly signaling the deceleration of the vehicle to other vehicles.

Numeral 13600 designates a cancellation switch whereby when this switch is automatically turned on by a manual switch, a switch operatively associated with the accelerator pedal or the timing contacts of a timer, the oscillating means 13400 stops oscillating restoring the initial conditions.

Figure 27:
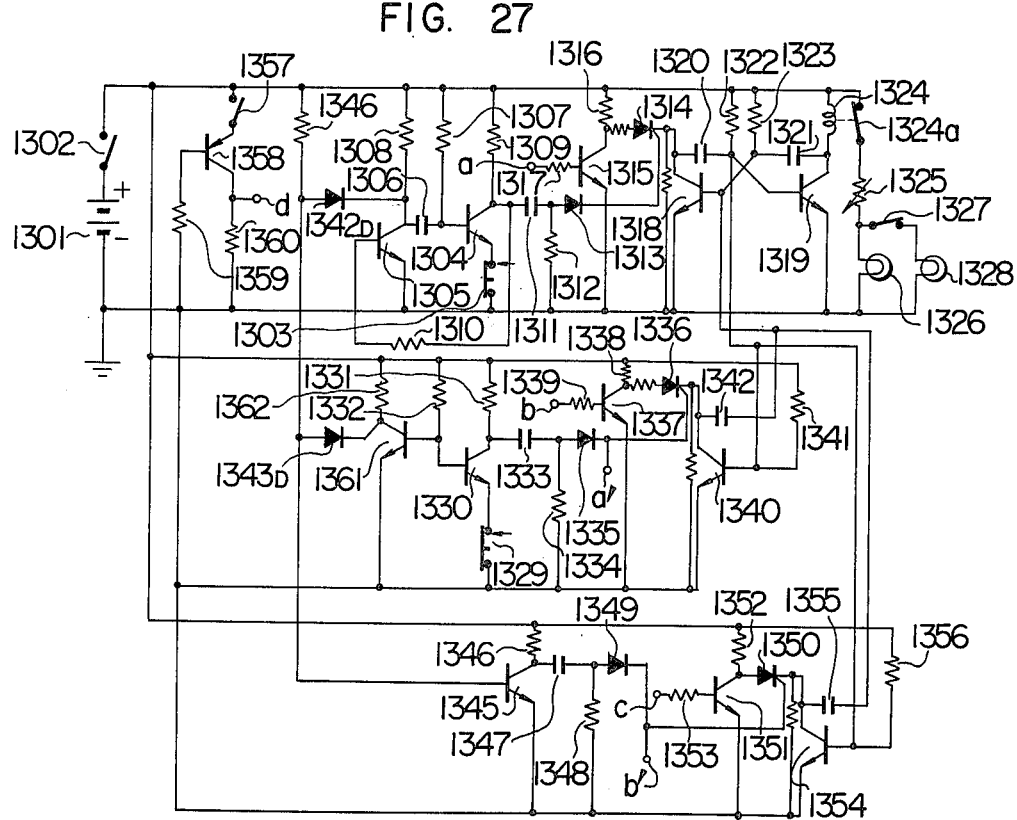
FIG. 27 is a detailed circuit diagram for the thirteenth embodiment shown in FIG. 26.

The thirteenth embodiment of the system of this invention will now be described in greater detail with reference to the circuit diagram of FIG. 27.

In the Figure, numeral 1301 designates a battery, 1302 an ignition switch, 1303 a normally closed deceleration detector (operable at low values of G and corresponding to the previously mentioned detector 13100) which is connected to the emitter of a transistor 1304. A transistor 1305 constitutes a monostable multivibrator along with the transistor 1304. Numerals 1306 and 1307 designate respectively a multivibrator timing capacitor and resistor, 1308 and 1309 collector resistors to which a positive feedback connection is made through the resistor 1309. A capacitor 1311 and a resistor 1312 constitute a differentiation circuit with the resistance value of the resistor 1312 selected considerably greater than that of the resistor 1309. Numeral 1313 designates a negative pulse blocking diode connected to the gate of a thyristor 1314, 1315 a cancellation transistor for the thyristor 1314, 1316 and 1317 respectively a collector resistor and a base resistor, 1318 and 1319 transistors constituting an astable multivibrator corresponding to the oscillator circuit 13410 shown in FIG. 26, 1320 and 1321 multivibrator capacitors, 1322 and 1323 base resistors, 1324 a relay constituting a collector load, 1324a the contacts (normally closed) of the relay 1324, 1325 a variable resistor whose resistance value varies with the value of deceleration, 1327 a switch operatively associated with the tail lamp switch and adapted to remain in the closed position during the day, 1326 and 1328 indicator lamp, 1329 a second normally closed deceleration detector (operable at higher values of G than the G sensor 1303 and corresponding to the detector 13200 of FIG. 26) which is connected to the emitter of a transistor 1330.

Figure 26:
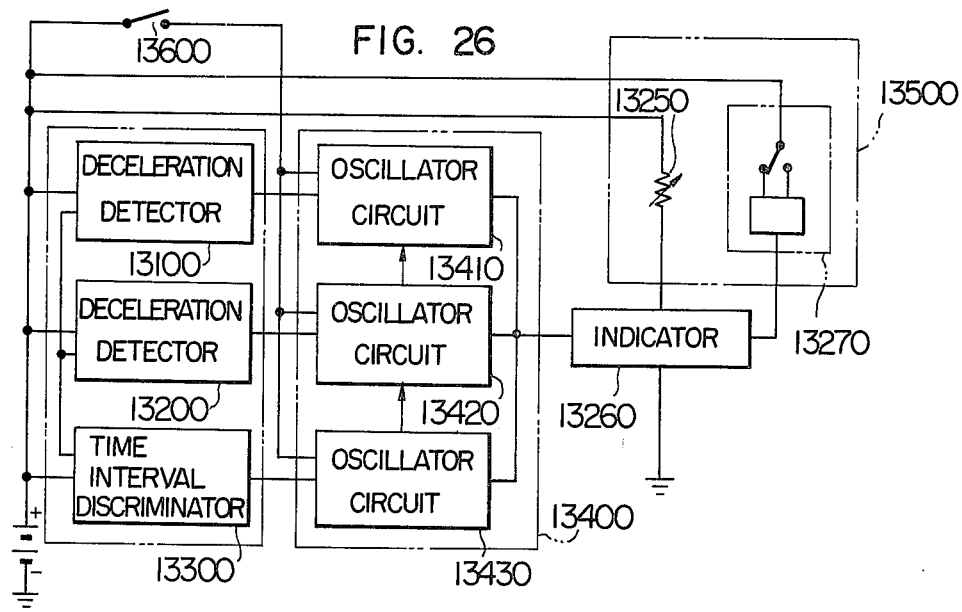
FIG. 26 is a block diagram showing a thirteenth embodiment of the system of this invention.

Numerals 1331 and 1332 designate respectively a collector resistor and a base resistor of the transistor 1330, 1333 and 1334 a capacitor and a resistor constituting a differentiation circuit with the resistance value of the resistor 1334 selected considerably greater than that of the resistor 1331, 1361 a switching transistor, 1362 a collector resistor, 1335 a negative pulse blocking diode connected to the gate of a thyristor 1336, 1337 a transistor for turning off the thyristor 1336, 1338 and 1339 a collector resistor and a base resistor, 1340 a transistor constituting, along with the transistor 1319, an astable multivibrator corresponding to the oscillator circuit 13420 shown in FIG. 26, 1342 and 1341 a capacitor and a resistor for the multivibrator. Numerals 1342D and 1343D designate diodes constituting an AND circuit for the transistors 1305 and 1361, 1345 a driving transistor, 1346 a collector resistor, 1347 and 1348 a capacitor and a resistor constituting a differentiation circuit with the resistance value of the resistor 1348 selected considerably greater than that of the resistor 1346, 1349 a negative pulse blocking diode connected to the gate of a thyristor 1350. Numeral 1351 designates a transistor for turning off the thyristor 1350, 1352 and 1353 a collector resistor and a base collector, 1354 a transistor constituting, along with the transistor 1319, an astable multivibrator corresponding to the oscillator circuit 13430 shown in FIG. 26, 1355 and 1356 a capacitor and a resistor for the multivibrator, 1357 a cancellation switch which is turned on in response to the depression of the accelerator pedal, 1358 a transistor which is turned on in response to the turning on of the switch 1357, 1360 and 1359 an emitter resistor and a base resistor. As regards terminal symbols a, b, c, d, a', b' and b', the terminal a is connected to the terminal a', the terminal b to the terminal b' and the terminal d to the terminals a, b and c, although these connections are not shown.

With the construction described above, the operation of this thirteenth embodiment is as follows. Under acceleration conditions, i.e., when the accelerator pedal is being depressed, the cancellation switch 1357 is turned on so that the transistors 1315, 1337 and 1351 are turned on and the thyristors 1314, 1336 and 1350 are held off or non-conductive since their tendency to turn on is cancelled. Consequently, the three astable multivibrators, i.e., the transistors 1318 and 1319 (13410), the transistors 1340 and 1319 (13420) and the transistors 1354 and 1319 (13430) are prevented from oscillating causing the transistor 1319 to remain on and the contacts 1324a remain open causing the lamps 1326 and 1328 to go off.

Then, with the accelerator pedal released, when the deceleration detector 1303 (corresponding to the detector 13100 of FIG. 26) is turned off, the transistor 1304 is turned off increasing its collector voltage and a positive differentiated waveform is applied to the gate of the thyristor 1314 through the diode 1313 turning it on, thereby causing the transistors 1318 and 1319 to start oscillating. Thus, the lamps 1326 and 1328 are caused to flash on and off with the time constants determined by the capacitors 1320 and 1321 and the resistors 1322 and 1323. The lamp 1328 is extinguished only in the night in response to the turning off of the switch 1327. The resistance value of the variable resistor 1325 varies in inverse proportion to the value of deceleration, namely, the resistance value decreases in proportion to the value of deceleration and the brightness of the lamps increases.

Then, with the accelerator pedal released, when the deceleration detector 1329 is turned off (when the detector 13200 of FIG. 26 is operated, namely, the value of deceleration is somewhat large) at the expiration of a short time after the turning off of the deceleration detector 1303, the transistor 1330 is turned off increasing its collector voltage so that a positive differentiated pulse is applied to the gate of the thyristor 1336 turning it on and the transistors 1340 and 1319 (corresponding to the oscillator circuit 13420 of FIG. 26) starts a free-running multivibrator operation. At the same time, the positive differentiated pulse is applied to the terminal a since the terminal a' is connected with the terminal a so that the transistor 1315 is turned on momentarily and the thyristor 1314 is turned off, stopping the free-running oscillation of the transistors 1318 and 1319. Consequently, the lamps 1326 and 1328 are caused to flash on and off with the time constants determined by the capacitors 1342 and 1321 and the resistors 1341 and 1323.

On the other hand, with the accelerator pedal released, when, immediately after the turning off of the deceleration detector 1303, the deceleration detector 1329 corresponding to the detector 13200 of FIG. 26 is turned off (when the vehicle undergoes a deceleration having a very high slope such as during collision or rapid braking or full locking), as previously noted, the transistor 1304 is turned off due to the turning off of the deceleration detector 1303 and the transistor 1350 remains on for a period of time determined by the time constant of the capacitor 1306 and the resistor 1307, during which time the deceleration detector 1329 is turned off and the transistor 1330 is turned off causing the transistor 1361 to turn on and the transistor 1345 to turn off. Thus, a positive differentiated pulse is applied from the differentiation circuit of the capacitor 1347 and the resistor 1348 to the gate of the thyristor 1350 through the diode 1349, so that the transistor 1354 starts, along with the transistor 1319, a free-running oscillating action corresponding to the oscillator circuit 13430 of FIG. 26 with the time constants determined by the capacitors 1355 and 1321 and the resistors 1356 and 1323 and thus the lamps 1326 and 1328 start flashing on and off in accordance with the free-running oscillation period. In this case, the positive differentiated pulse is also applied to the base of the transistor 1337 so that the transistor 1337 is turned on and the thyristor 1336 is turned off stopping simultaneously the free-running operation of the transistors 1340 and 1319 corresponding to the oscillator circuit 13420 of FIG. 26.

With the lamps flashing on and off in any one of these situations, when the accelerator pedal is depressed, the switch 1357 corresponding to the cancellation switch 13600 of FIG. 26, is turned on and a positive signal is applied from the terminal d to the corresponding one of the terminals a, b and c stopping the oscillation.

Figure 28:
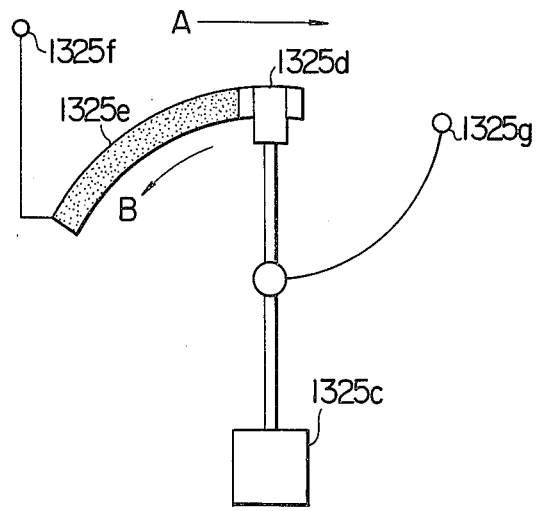
FIG. 28 is a front view showing schematically the deceleration detector used in the embodiment shown in FIG. 26.

Next, the variable resistor 1325 whose resistance value varies with the value of deceleration will be described with reference to FIG. 28. In the Figure, numeral 1325c designates a weight, 1325d a movable contact which is disposed so that when the running vehicle is decelerated in the direction of an arrow A the movable contact 1325d swings in the direction of an arrow B and slides over a slide resistor 1325e and thus the resistance between terminals 1325f and 1325g decreases as the movable contact 1325d moves in the direction of the arrow B. While, in this thirteenth embodiment, the above-described variable resistor is used as one form of the variable output means (voltage control means), the variable resistor may alternately be connected in parallel with the indicator (in addition to a fixed resistor connected in series with the indicator) so as to vary the voltage applied to the indicator or alternately a plurality of resistors having different resistance values may be selectively operated by means of sets of relay contacts which are responsive to the operation of the associated G sensors.

Figure 29:
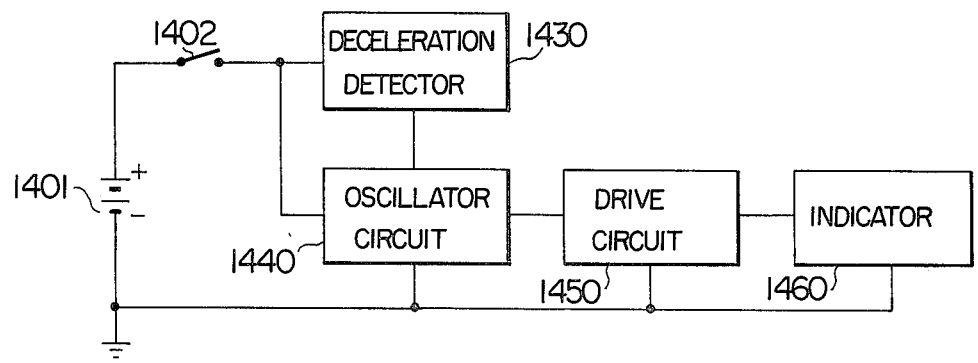
FIG. 29 is a block diagram showing a fourteenth embodiment of the system of this invention.
Figure 30:
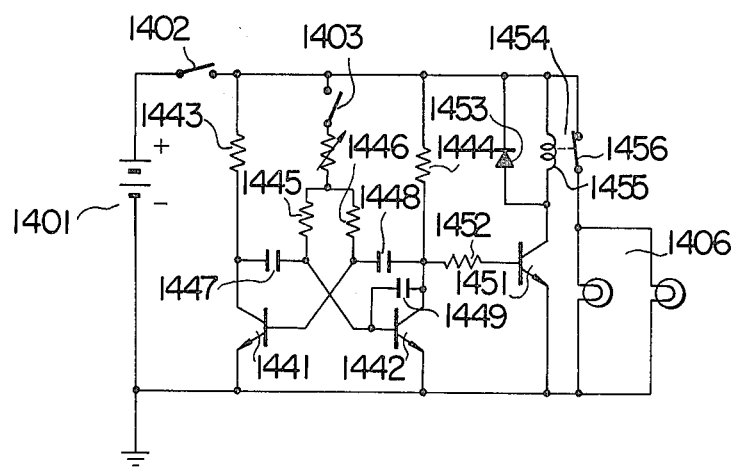
FIG. 30 is a detailed circuit diagram for the fourteenth embodiment shown in FIG. 29.

A fourteenth embodiment of the system of this invention will now be described with reference to FIGS. 29 and 30. In FIG. 29 showing the fourteenth embodiment in block diagram form, numeral 1401 designates a battery, 1402 an ignition switch, 1430 a deceleration detector, 1440 an oscillator circuit 1450 a drive circuit, and 1460 an indicator. In this block diagram, when the vehicle undergoes a deceleration greater than a predetermined value, the resistance value of the deceleration detector 1430 rapidly decreases from the inifinity in accordance with the value of deceleration and the oscilator circuit 1440 starts oscillating. The oscillation frequency of the oscillator circuit 1440 varies with the resistance value of the deceleration detector 1430 so that the drive circuit 1450 is switched on and off alternately and the indicator 1460 is turned on and off alternately, thereby quantitatively signaling the deceleration of the vehicle to other vehicles.

The operation of the above-described fourteenth embodiment will now be described in greater detail with reference to FIG. 30. When the ignition switch 1402 is turned on, under normal driving conditions (where the vehicle has no deceleration) the deceleration detector 1403 remains off or non-conductive (the resistance value is inifinity) and no current flows to the bases of transistors 1441 and 1442 turning them off and producing no oscillations. Consequently, a transistor 1451 is turned on because of the base current now flowing thereto through resistors 1444 and 1452 and a coil 1445 of a normally closed relay 1454 is energized opening contacts 1456. Thus, lamps 1406 remain off. On the other hand, when the vehicle undergoes a deceleration greater than the predetermined value, the deceleration detector 1403 is energized supplying current to the transistors 1441 and 1442 through their respective base resistors 1445 and 1446. Consequently, the transistors 1441 and 1442 start oscillating and the transistor 1451 is switched on and off in accordance with the output voltage of the transistor 1442. When this occurs, the current flow to the coil 1455 of the relay 1454 is switched on and off in accordance with the oscillation period of the oscillator circuit 1440 and the lamps 1406 are caused to flash on and off. In this embodiment, since the deceleration detector 1403 is designed so that its resistance value varies in inverse proportion to the deceleration of the vehicle, higher the deceleration of the vehicle is, greater the number of the flashing operations become, that is, the oscillation frequency of the oscillator circuit 1440 increases and in this way the degree of danger is quantitatively signaled to the following vehicle. Numeral 1443 designates a resistor, 1449 a capacitor, 1453 a diode. Numerals 1447 and 1448 designate capacitors.

Figure 31:
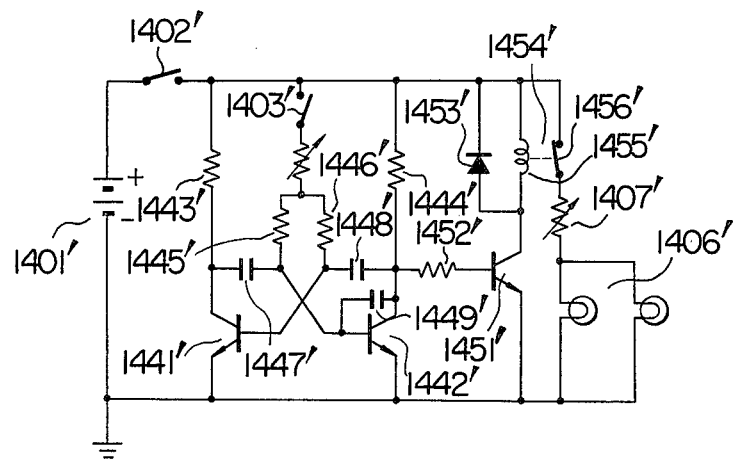
FIG. 31 is another detailed circuit diagram for the embodiment shown in FIG. 29.

A modified form of the embodiment shown in FIG. 30 will now be described with reference to FIG. 31. In this modified form, the oscillation frequency is varied by a first deceleration detector and the voltage applied to the indicator is controlled by a second deceleration detector thereby controlling for example the flashing period and brightness of the lamps in accordance with the value of deceleration. The operation of this modification wil now describe in greater detail with reference to FIG. 31. With an ignition switch 1402' turned on, under normal driving conditions where the vehicle has no deceleration a first deceleration detector 1403' is off and no current flows to the bases of transistors 1441' and 1442' turning them off and preventing them from oscillating. Consequently, a transistor 1451' is turned on because of the base current now flowing thereto through resistors 1444' and 1452' and a coil 1455' of a normally closed relay 1454' is energized opening contacts 1456'. As a result, no current flows to a second deceleration detector 1407' and lamps 1406' remain off. Then, when the vehicle undergoes a deceleration greater than a predetermined value, the first deceleration detector 1403' is energized supplying current to the bases of the transistors 1441' and 1442' through their respective base resistors 1445' and 1446' so that oscillator's oscillation is started and the transistor 1451' is switched on and off alternately in accordance with the output voltage of the transistor 1442'. Consequently, the flow of current to the coil 1455' of the relay 1454' is switched on and off in accordance with the oscillation period of the oscillator and the contacts 1456' are opened and closed alternately causing the lamps 1406' to flash on and off. In this embodiment, since the deceleration detectors 1403' and 1407' are designed so that the resistance value of these resistors varies in inverse proportion to the value of the deceleration of the vehicle, and consequently the number of the flashes per unit time of the lamps 1406' increases in proportion to the value of the vehicle's deceleration and the brightness of the lamps 1406' also increases in proportion to the value of the deceleration thus quantitatively signaling the degree of danger to the following vehicle.

Figure 32:
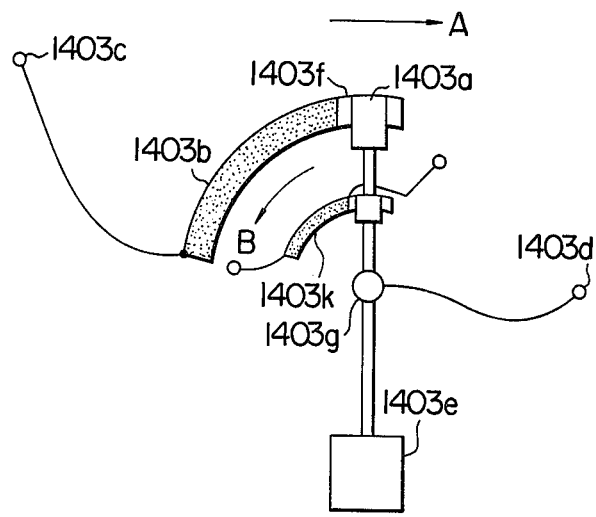
FIG. 32 is a front view showing schematically the deceleration detector used in the embodiment shown in FIG. 31.
Figure 33:
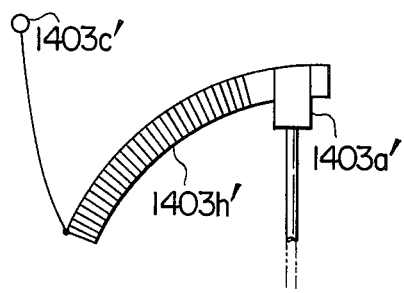
FIG. 33 is a partial front view showing schematically a modified form of the deceleration detector used in the embodiment shown in FIGS. 30 and 31.
Figure 34:
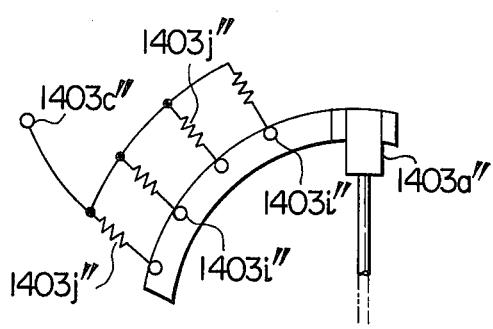
FIG. 34 is a partial front view showing schematically another modified form of the deceleration detector used in the embodiment of FIGS. 30 and 31.

Next, the variable resistor used in the abovedescribed fourteenth embodiment will now be described with reference to FIG. 32. In the Figure, when the vehicle moving in the direction of an arrow A is decelerated rapidly, a movable electrode 1403a is moved in the direction of an arrow B. Consequently, the movable electrode 14032a slides over a carbon resistance surface 1403b so that the amount of movement of the movable electrode 1403a in the direction of the arrow B is increased in proportion to the value of deceleration, whereas the value of the resistance between lead wires 1403c and 1403d decreases. In the Figure, numeral 1403e designates a weight, 1430f an insulation portion, 1403g a rotary shaft. Further, as shown in FIG. 33, the resistance surface may be made of a resistance wire. Still, further, as shown in FIG. 34, a plurality of resistors 1403j'' having different resistance values may be connected respectively to the associated ones of a plurality of tap electrodes 1403i'' arranged in a row. In FIG. 32, numeral 1403k is a small variable resistance surface which may be used as the detector 1403 of FIG. 31, while the resistance surface 1403b may be used as the detector 1407 of FIG. 31.

A fifteenth embodiment of the system of this invention will now be described with reference to FIG. 35. In the Figure, numeral 1501 designates a battery, 1502 an ignition switch 1540 a deceleration detector having a plurality of sets of contacts 1530 control means for changing the indication differently according to the contact position of the deceleration detector 1540, 1550 an indicator 1542 through 1546 a plurality of sets of contacts, 1531, 1532, 1533, 1534 and 1535 resistors having different resistance values.

With the construction described above, when the vehicle undergoes a deceleration so that the contacts corresponding to the value of the deceleration are closed (e.g., the contacts 1544 are closed when the vehicle undergoes a deceleration of 0.3 G), the lamp 1550 is lighted through for example the resistor 1533 and thus the brightness of the lamp 1550 is limited by the resistor 1533. Then, as the vehicle undergoes a deceleration fo for example 0.5 G, the contacts 1546 are closed and the lamp 1550 is lighted through the resistor 1535. In this case, if the resistance values of the resistors 1531, 1532, 1533, 1534 and 1535 are selected to be smaller than the preceeding one in this order, the brightness of the lamp 1550 increases in proportion to the value of deceleration. Thus, by mounting the lamp 1550 at the rear of the vehicle, the deceleration of the vehicle may be quantitatively signaled to other vehicles.

Figure 37A:
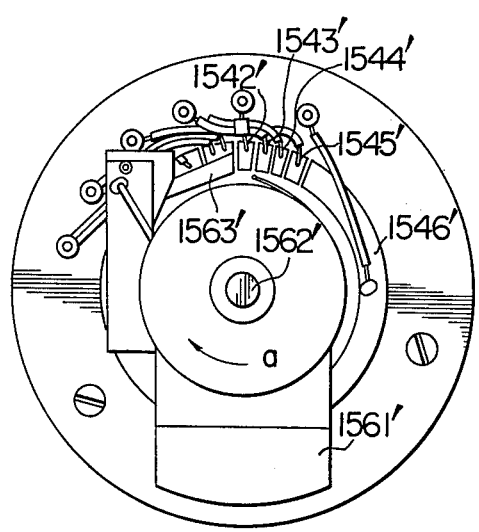
FIGS. 37(A) and 37(B) are respectively a front view and right side view of the deceleration detector used in the embodiment shown in FIGS. 35 and 36.
Figure 37B:
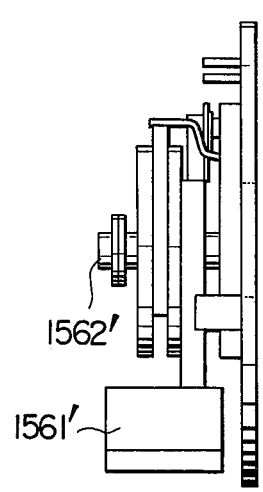
Figure 38:
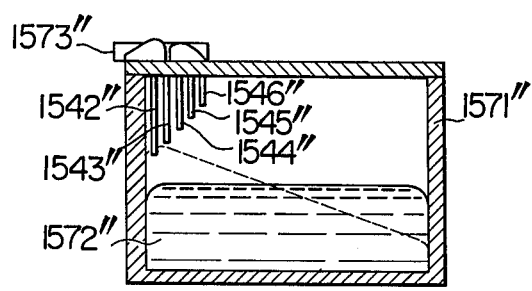
FIG. 38 is a sectional view showing a modified form of the deceleration detector used in the embodiment shown in FIGS. 35 and 36.

Next, the deceleration detector used in this embodiment will now be described with reference to FIGS. 37(A) and 37(B) showing an embodiment thereof, in which numeral 1561' designates a weight which is rotated about a fulcrum 1562' in the direction of an arrow a on deceleration, 1563' a movable contact which is integral with the weight 1561', 1542', 1543', 1544', 1545' and 1546' a plurality of stationary contacts. FIG. 38 shows a modified form of the abovedescribed deceleration detector in which numeral 1571'' designates a body constituting a positive electrode, 1572'' mercury, 1542'', 1543'', 1544'', 1545'' and 1546'' a plurality of negative terminals having different heights and positions and insulated from the casing by an insulating material 1573''.

Figure 35:
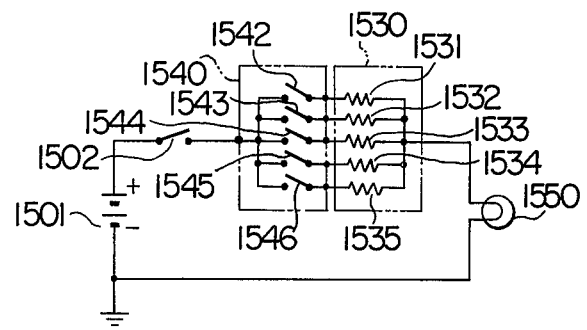
FIG. 35 is a circuit diagram showing a fifteenth embodiment of the system of this invention.
Figure 36:
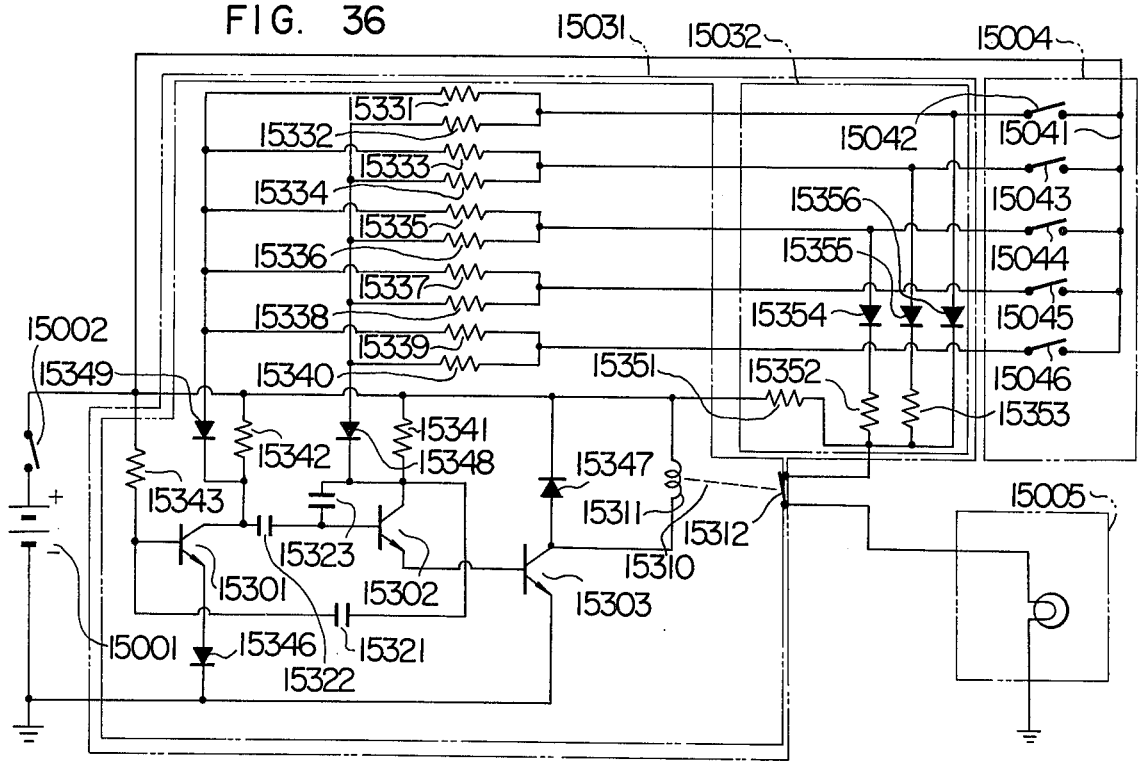
FIG. 36 is a circuit diagram showing a modified form of the embodiment shown in FIG. 35.

FIG. 36 shows a modified form of the embodiment shown in FIG. 35. In the Figure, numeral 15004 designates a deceleration detector, 15041 a common contact, 15042, 15043, 15044, 15045 and 15046 a plurality of conacts operable at different values of G (e.g., the contact 15042 is operable at 0.1 G and the contact 15043 at 0.2 G and so on), 15031 an oscillator circuit comprising an astable multivibrator whose oscillating conditions are changed in accordance with resistors 15331, 15332, 15333, 15334, 15335, 15336, 15337, 15338, 15339 and 15340 when any one of the contacts is closed in the deceleration detector 15004, 15310 a relay for receiving the oscillator signal to open and close ints contacts 15312 alternately, 15352 and 15353 resistors for varying the brightness of the indicator 15005, 15311 a coil of the relay 15310, 15312 the normally closed contacts, 15347 a surge absorbing diode, 15303 a transistor for controlling the relay 15310, 15301 and 15302 transistors constituting a multivibrator, 15321 and 15322 timing capacitors, 15354, 15355 and 15356 reverse current blocking diodes, 15348 and 15349 reverse current blocking diodes for preventing the timing settings from becoming abnormal. Numerals 15341, 15342 and 15343 designate resistors, 15323 a capacitor, 15346 a breakdown preventive diode for protecting a transistor 15301, 15032 a current limiting circuit.

With the construction described above, when any one of the contacts in the deceleration detector 15004 is closed (e.g., when the contact 15044 is closed on deceleration of 0.3 G), a positive signal is supplied to the respective bases of the both transistors 15301 and 15302 of the oscillator circuit 15031 (multivibrator) through the respective resistors 15335 and 15336, whereby the oscillator circuit 15031 begins to oscillate whose oscillation conditions are determined by those resistors 15335 and 15336. By selecting different resistance values for the resistances 15331 through 15340 to vary the oscillation conditions in accordance with the operating conditions of the contacts in the deceleration detector 15004, it is possible for example to vary the number of flashing operations of the indicator lamp 15005 (e.g., the number of flashing operations increases in proportion to the value of deceleration) or to vary the percentage of lamp "on" time or duty cycle (on-time/period) in accordance with the value of deceleration. For instance, if the number of flashing operations of the lamp is increased, the duty cycle is reduced to prevent the lamp from being apparently continuously lighted. In other words, there is possibility that if the duty cycle is not reduced, as the number of flashing operations increases, only the flashes of light attract one's attention and the lamp appears as if it were continuously lighted. As regards the resistors 15351, 15352 and 15353, the resistance value of the resistor connected in series with the lamp 15005 is varied in accordance with the operating conditions of the contacts in the deceleration detector 15004, thereby varying the brightness of the lamp 15005. In this way, the brightness of the lamp is incresed in proportion to the value of deceleration. While the resistors are selected to reduce the lamp duty cycle as the number of flashing operations is increased, it is also possible to select the resistors 15351, 15352 and 15353 to easily prevent the lamp from becoming dim as the lamp duty cycle is reduced. The operation of the deceleration detector will now be described. In FIG. 37, when the vehicle undergoes deceleration, the pendulumn rotates through an angle determined by the value of deceleration so that the corresponding contact (e.g., the contact 1545') is engaged with the movable contact 1563' conducting current. On the other hand, in FIG. 38, the mercury 1572" is deformed as shown by the broken lines in accordance with the value of deceleration so that the mercury 1572" comes into contact with the contact corresponding to the deformation of the mercury 1572" supplying current between the contact (e.g., the contact 1544") and the positive contact 1572". Further, in order that the brightness of the indicator lamp may appear fixed to the eyes of the following vehicle's driver despite the increased number of flashing operations as noted previously, the lamp duty cycle is exponentially reduced as the number of flashing operations is increased, while the brightness of the indicator lamp is increased.

A sixteenth embodiment of the system of this invention will now be described with reference to FIG. 39. In the Figure, numeral 1611 designates a known type of direct-current to alternating-current converter (hereinafter referred to as a DC-AC converter), 1612 a transformer having a primary winding 1612a and a second winding 1612b, 162a3, 163a4, 163a3, 164a4 and 164a2 switching means operable by the associated deceleration detectors responsive to different values of deceleration which may for example be contacts of relays that are operated by the contacts of known type of pendulumn inertia detecting switches. Numerals 1614 and 1614a designate lamps constituting indicator means and mounted at the rear of the vehicle (near the brake lamps), 1601 a vehicle battery, 1615 control means that will be described later.

The above-described sixteenth embodiment operates as follows. The DC current from the battery 1601 is converted by the DC-AC converter 1611 to an AC current which in turn is applied to the primary winding 1612a of the transformer 1612. The transformer secondary winding 1612b having a plurality of taps 1613 is provided with the contacts 162a3, 163a4, 163a3, 164a4 and 164a2 of the switching means which are turned on and off by the associated deceleration detectors which are responsive to different values of deceleration, so that the contacts 162a3 and 163a4 are turned on when the deceleration is minimum and a small voltage is applied to the back lamps 1614 and 1614a. The contacts 163a3 and 164a4 are turned on under a greater deceleration so that a higher voltage is applied to the lamps 1614 and 1614a causing them to light up with a greater intensity. When the contacts 164a2 are turned on, the lamps 1614 and 1614a light up with a still greater intensity. In this way, the brightness of the lamps is increased in proportion to the value of deceleration thus enabling the driver of the following vehicle to grasp the deceleration condition of the vehicle equipped with the system of this invention.

Figure 39:
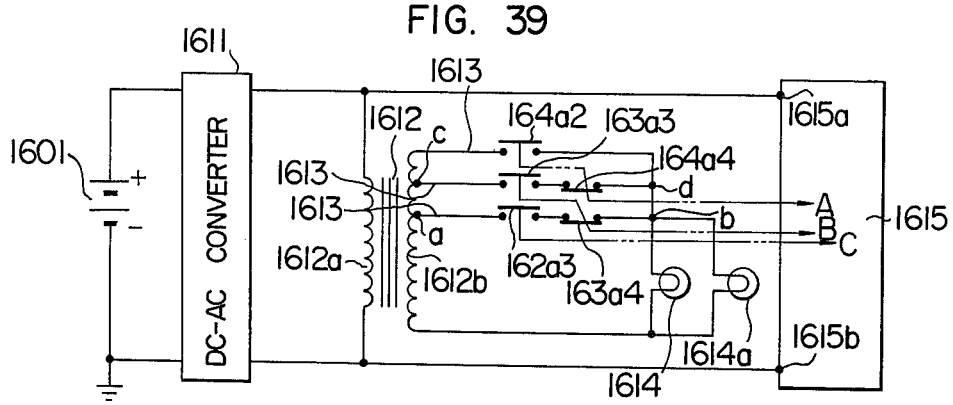
FIG. 39 is a circuit diagram showing a sixteenth embodiment of the system of this invention.
Figure 40:
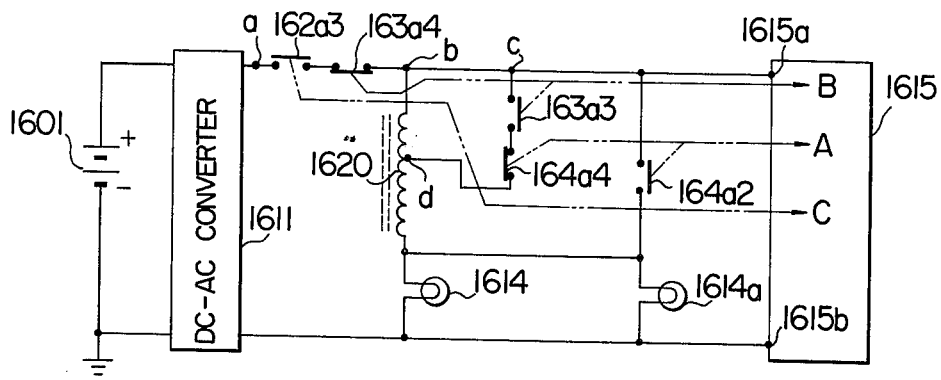
FIG. 40 is a circuit diagram showing a modified form of the embodiment shown in FIG. 39.

In FIG. 40 showing a modified form of the embodiment shown in FIG. 39, numeral 1620 designates a reactor, and other elements designed by the like numerals are identical with those shown in FIG. 39. The arrangement of FIG. 40 utilizes the fact that the effective power is not consumed in any great amount even if the AC power is supplied to the reactor 1620, and it is designed so that when the contacts 162a3 and 163a4 are closed under low deceleration, the voltage dropped by the reactor 1620 is applied to the back lamps 1614 and 1614a causing them to light up with a moderate intensity or brightness. When the contacts 163a3 and 164a4 are closed under a higher deceleration, a portion of the reactor 1620 is short-circuited and thus the lamps 1614 and 1614a are lighted with an increased intensity. At the maximum deceleration, the entire reactor 1620 is short-circuited and the full voltage is applied to the lamps 1614 and 1614a signaling that the vehicle is undergoing rapid deceleration.

Figure 41:
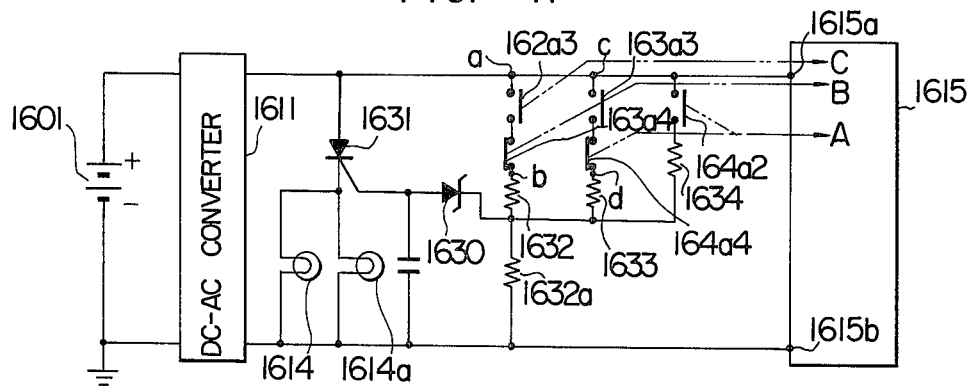
FIG. 41 is a circuit diagram showing another modified form of the embodiment shown in FIG. 39.

Referring to FIG. 41 showing another modified form of the embodiment shown in FIG. 39, voltage control means employing phase control will be described. For example, when the AC voltage reaches a predetermined value in the course of its rise along the sine curve so that a zener diode 1630 is rendered conductive, a thyristor 1631 is turned on. In this case, if the contacts 162a3 and 163a4 are closed on low deceleration so that a resistor 1632, whose resistance value is the largest among the resistors 1632, 1633 and 1634, is connected in series with a resistor 1632a, the zener diode 1630 is rendered conductive with a delay, whereas when the contacts 164a2 are closed under a higher deceleration, the smallest resistor 1634 is connected in series with the resistor 1632a in response to the closing of the contacts 164a2 and the zener diode 1630 is rendered conductive earlier. In other words, by selectively using the resistors 1632, 1633 and 1634, the phase control of the AC voltage is accomplished through the thyristor 1632. Thus, the brightness or the lighting duration of the back lamps 1614 and 1614a is controlled in accordance with the value of deceleration.

Figure 42:
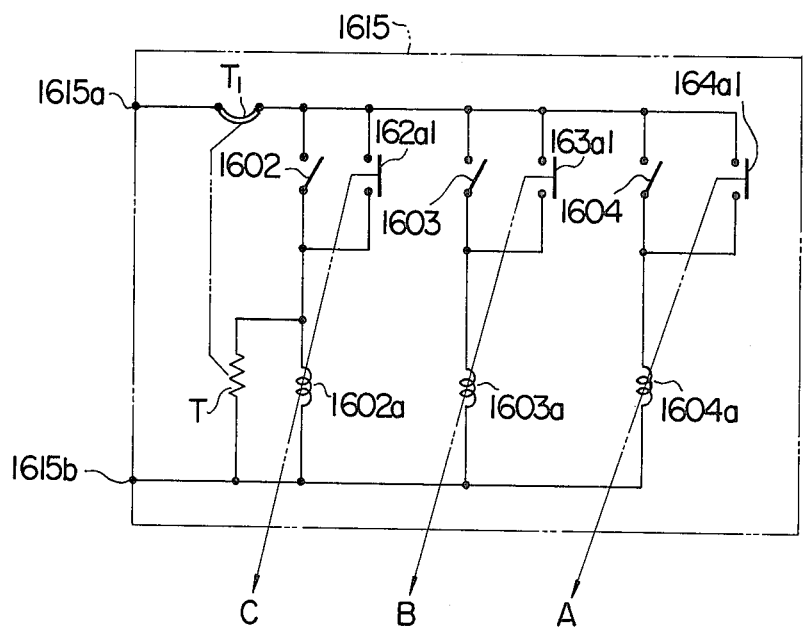
FIG. 42 is a detailed circuit diagram of the deceleration detecting section used in the embodiment shown in FIGS. 39, 40 and 41.

The DC-AC converter 1611 may comprise a known type of oscillator circuit employing semiconductor elements or it may comprise a motor-generator consisting of a DC motor directly coupled to an AC generator. Alternately, the AC output of the vehicle alternator may be utilized instead of providing any DC-AC converter. Referring now to FIG. 42, a circuit diagram of the control means 1615 will now be described. Deceleration detectors 1602, 1603 and 1604 (hereinafter referred to as G sensors) each consists of a known type of inertia detecting switch which is turned on by the inertia of a pendulum. When the G sensor 1602 is turned on under low deceleration a relay coil 1602a is energized to cause its contacts 162a1 to close and thereby the contact 162a1 remain closed by a self-holding action since the relay coil 1602a is kept energized by the current flowing through the contacts 162a1. At the same time, the heating of a resistance wire T is started owing to the current flowing therethrough. And when this control means 1615 is employed in place of the corresponding control means 1615 in the embodiment shown in FIG. 41, for example, the energization of the relay coil 1602a also effects the contacts 162a3 (in FIG. 41) to cause them to close together with the closure of the contacts 162a1 (in FIG. 42) as noted by the dot-and-dash lines (the dot-and-dash lines A, B and C respectively indicate the connections between the associated relay coils and the contacts). Explaining the above operation again with reference to FIGS. 41 and 42, when G sensor 1602 is closed upon low deceleration causing the relay coil 1602a to be energized, whereby both contacts 162a1 and 162a3, which are associated with the relay coil 1602a, are closed, the terminals a and b shown in FIG. 41 are electrically connected to proceed the operation of the thyristor 1631 as described with reference to FIG. 41.

During the above operation, the resistance wire T is heated as described above, wherein the heat produced at the resistance wire T affect a bimetal switch $T_1$, whereby the bimetal switch $T_1$ is turned off when it is sufficiently heated to cause it open after a certain time has elapsed. Accordingly, the self-holding action caused by the relay coil 1602a, and the contacts 162a1 is released, rendering the contacts 162a3 (in FIG. 41) to open, thus stopping the flashing operation of the lamps 1614 and 1614a. When the vehicle undergoes an intermediary deceleration, the G sensors 1602 and 1603 are turned on. Consequently, a relay coil 1603a as well as the relay coil 1602a is held energized by the self-holding actions of their contacts 163a1 and 162a1 as in the same manner as above. As a result, the contacts 163a3 are closed by the relay 1603a as indicated by the dot-and-dash line B so that the circuit is established between terminals c and d to cause the thyristor 1631 to operate in accordance with the respective set values of the zener diode 1630 and the resistors 1633 and 1632a. On the other hand, the contacts 162a3 are closed by the energization of the relay coil 1602a as in the same manner, however, the contacts 163a4 are contrary opened by the energization of the relay coil 1603a, whereby the terminals a and b are opened resulting in no effect on the zener diode 1630 through the resistor 1632. At the maximum deceleration, the G sensor 1604 is also turned on together with other G sensors 1602 and 1603, so that each of the contacts 162a1, 163a1 and 164a1 is kept closed by the energization of the respective relay coils 1602a, 1603a and 1604a until the bimetal switch $T_1$ is turned off in response to the heat at the resistance wire T as already explained. When all of the relay coils are energized, the following operations are carried out. Firstly, the contacts 163a3 are opened by the energization of the relay coil 1603a, whereby the terminals a and b are opened even though the contacts 162a3 are closed by the energization of the relay coil 1602a as mentioned above. Secondly, the contacts 164a4 are opened by the energization of the relay coil 1604a, whereby the terminals c and d are likewise opened even though the contacts 163a3 are closed by the energization of the relay coil 1603a. Finally, the contacts 164a2 are closed by the energization of the relay coil 1604a together with the closure of the contacts 164a1, whereby the thyristor 1631 is operated in accordance with the respective set values of the zener diode 1630 and resistors 1634 and 1632a. In other words, one of the contact set groups is closed for a predetermined time in accordance with the value of deceleration.

Figure 43:
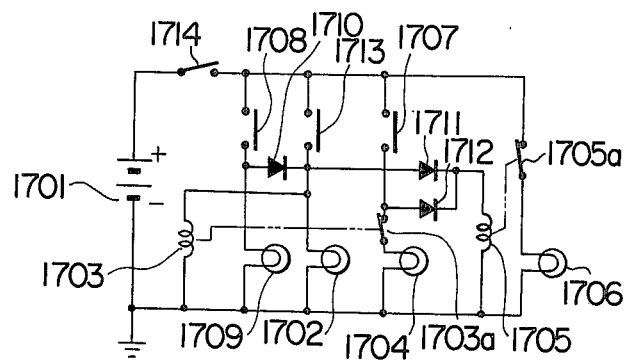
FIG. 43 is a circuit diagram showing a seventeenth embodiment of the system of this invention.

A seventeenth embodiment of the system of this invention will now be described with reference to FIG. 43. In the Figure, when a brake switch 1713 which is operatively associated with the brake pedal is turned on, a brake lamp 1702 (deceleration indicator) is lighted and at the same time a relay coil 1703 is energized preventing the lighting of an acceleration lamp 1704 by causing normally closed contacts 1703a of the relay to open. Simultaneously, a service lamp 1706 is extinguished by the energization of a relay 1705 through a diode 1711. When the accelerator pedal (not shown) is depressed, an acceleration switch 1707 is turned on. In this case, if the brake pedal is depressed simultaneously, the brake lamp 1702 is preferentially lighted. Then, as the vehicle undergoes a deceleration greater than a predetermined value, a deceleration switch 1708 is turned on and a deceleration indicator lamp 1709 is lighted. If the color of the deceleration indicator lamp 1709 is the same as the brake lamp 1702 (e.g., red), essentially this is the same as if the light output of the brake lamp 1702 were increased thus sending out a strong signal to the following vehicle and emphatically warning the following vehicle against danger. On the other hand, the deceleration indicator lamp 1709 may be designed to give off colored light which is different from those of the acceleration lamp 1704, the brake lamp 1702 and the service lamp 1706, and this colored light will become more appealing to danger since the deceleration indicator lamp 1709 is lighted very rarely. When neither of the lamps 1702 and 1704 is turned on, the service lamp 1706 is lighted by the action of the relay 1705 and the contacts 1705a clearly indicating that not only the acceleration and braking operations are not taking place, but also the vehicle has no deceleration. In the Figure, numerals 1710, 1711 and 1712 designate diodes for blocking reverse current and preventing erroneous operation of the lamps 1702, 1704 and 1706, 7091 a vehicle battery, 1714 a key switch.

Figure 44:
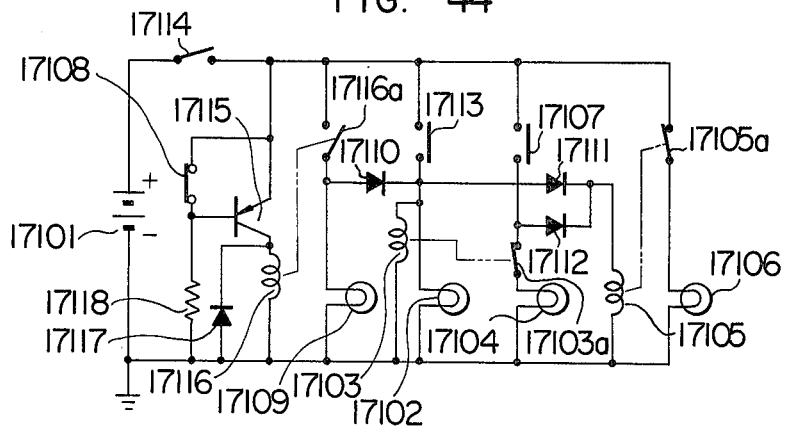
FIG. 44 is a circuit diagram showing a modified form of the embodiment shown in FIG. 43.

A modified form of the embodiment shown in FIG. 43 will now be described with reference to FIG. 44. In the Figure, numeral 17108 designates a normally closed deceleration detector whereby when the vehicle undergoes deceleration, the deceleration detector 17108 is opened so that a transistor 17115 is turned on and a relay 17116 is energized closing contacts 17116a constituting a deceleration switch. The remaining operation is the same as that of the embodiment shown in FIG. 43. Numeral 17117 designates a reverse voltage absorbing diode, 17118 a base resistor.

Figure 45:
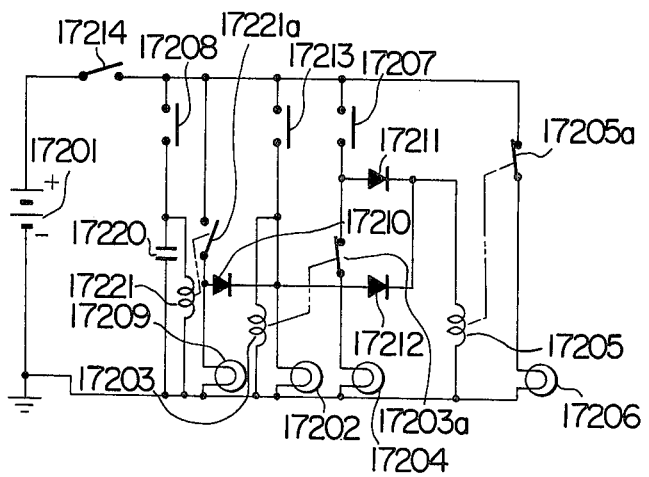
FIG. 45 is a circuit diagram showing another modified form of the embodiment shown in FIG. 43.

Another modified form of the embodiment shown in FIG. 43 will now be described with reference to FIG. 45. When a normally open deceleration detector 17208 is turned on, a capacitor 17220 is charged and a relay 17221 is energized thus closing contacts 17221a constituting a deceleration switch and thereby causing a deceleraion indicator lamp 17209 to go on. On the other hand, when a brake switch 17213 is turned on, a brake lamp 17202 is lighted and a relay 17203 is energized thus opening interlocking contacts 17203a and thereby preventing the lighting of an accelerator lamp 17204. The remaining operation is the same as described in connection with FIG. 43. Since the relay 17221 is held energized for a while by the action of the capacitor 17220 after the turning off of the deceleration detector 17208, the duration of the signaling time is long and an excellent signal is generated.

Figure 46:
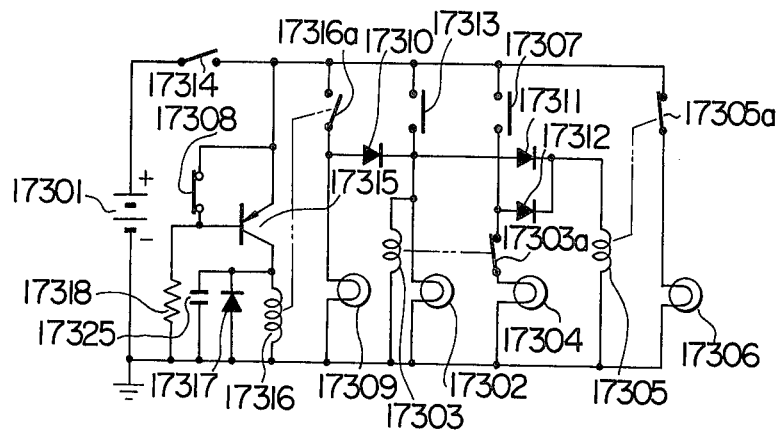
FIG. 46 is a circuit diagram showing still another modified form of the embodiment shown in FIG. 43.

Still another modified form of the embodiment shown in FIG. 43 will now be described with reference to FIG. 46. When the deceleration of the vehicle reaches a predetermined value (under rapid braking or the like), a deceleration detector 17308 is turned off and a transistor 17315 is turned on charging a capacitor 17325 and energizing a relay 17316 thereby closing contacts 17316a constituting a deceleration switch. Since the relay 17316 is held energized for a while by the remaining voltage on the capacitor 17325 after the turning off of the transistor 17315, erroneous flickering of the signal due to the chattering of the deceleration detector 17308 is prevented.

What is claimed is:

1. A deceleration indicating system for a motor vehicle comprising:
   a power source mounted in a motor vehicle;
   a deceleration indicating lamp provided on the rear end of said motor vehicle;
   first means for producing a deceleration signal in response to the degree of deceleration of said vehicle, said first means including a plurality of contact switches respectively operative in response to respective predetermined degrees of the vehicle deceleration, each of said contact switches being connected at one end with said power source;
   an oscillator for producing an ON-OFF signal, said oscillator including a first circuit for controlling the ON period of said ON-OFF signal in accordance with the time constant of said first circuit and a second circuit for controlling the OFF period of said ON-OFF signal in accordance with the time constant of said second circuit;
   a first group of resistors, each connected at one terminal thereof to a respective one of said switches and connected at the other terminal to said first circuit such that when said respective switches are operated the resistors connected thereto change the time constant of said first circuit;
   a second group of resistors, each connected at one terminal thereof to said switches and connected at the other terminal to said second circuit such that when said respective switches are operated the resistors connected thereto change the time constant of said second circuit;
   second means connected to said oscillator, for selectively applying a current to said deceleration indicating lamp to switch said lamp ON and OFF in accordance with said ON-OFF signal;
   a third group of resistors, each connected at one terminal thereof to a respective one of said switches and connected at the other terminal to said second means such that when said respective switches are operated the resistor connected thereto changes the current supplied to said lamp; and
   whereby the brightness of said lamp and the frequency of the lighting of said lamp are simultaneously varied in accordance with the degree of the deceleration of said motor vehicle.

2. A deceleration indicating system for a motor vehicle according to claim 1 wherein:
   said second means comprises an electromagnetic relay having a normally closed contact.

3. A deceleration indicating system for a motor vehicle according to claim 1 wherein:
   said first means includes a pendulum rotatable through an angle determined by the value of deceleration, and said plurality of switches comprises a common moveable contact cooperating with said pendulum and a plurality of stationary contacts, said respective groups of resistors being coupled to said stationary contacts, and said common moveable contact being coupled to said power source, said moveable contact being disposed to engage said respective stationary contacts in accordance with rotation of said pendulum.

4. A deceleration indicating system for a motor vehicle according to claim 1 wherein:
   said first means comprises an insulative chamber having disposed therein a first contact and a plurality of contacts displaced from said first contact and each other by predetermined distances and a quantity of mercury disposed in said chamber for deforming responsive to said vehicle deceleration to effect contact between said first contact and a respective one of said plurality of contacts in accordance with the value of said deceleration.

* * * * *